United States Patent
Soltani et al.

(10) Patent No.: US 11,659,459 B2
(45) Date of Patent: May 23, 2023

(54) WAVEFORM SWITCHING MECHANISM FOR DIGITAL MMWAVE REPEATERS IN HIGHER BANDS

(71) Applicant: QUALCOMM Incorporated, San Diego, CA (US)

(72) Inventors: Morteza Soltani, San Diego, CA (US); Jun Ma, San Diego, CA (US); Raviteja Patchava, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/401,738

(22) Filed: Aug. 13, 2021

(65) Prior Publication Data

US 2023/0052894 A1 Feb. 16, 2023

(51) Int. Cl.
*H04W 36/06* (2009.01)
*H04L 1/00* (2006.01)
*H04L 5/00* (2006.01)
*H04W 36/00* (2009.01)

(52) U.S. Cl.
CPC ........... *H04W 36/06* (2013.01); *H04L 1/0003* (2013.01); *H04L 5/0007* (2013.01); *H04W 36/0027* (2013.01)

(58) Field of Classification Search
CPC .............. H04W 36/06; H04W 36/0027; H04L 1/0003; H04L 5/0007
See application file for complete search history.

(56) References Cited

U.S. PATENT DOCUMENTS

| | | | |
|---|---|---|---|
| 10,523,358 B1 * | 12/2019 | Park | H04B 7/0686 |
| 2018/0035423 A1 * | 2/2018 | Wang | H04L 5/0007 |
| 2018/0324715 A1 * | 11/2018 | Ryoo | H04L 27/2646 |
| 2019/0215807 A1 * | 7/2019 | Hwang | H04L 5/00 |

* cited by examiner

*Primary Examiner* — Harry H Kim
(74) *Attorney, Agent, or Firm* — Procopio, Cory, Hargreaves & Savitch LLP

(57) ABSTRACT

A (repeater) node may identify a first indication of a waveform switch associated with a first link between a base station and the node or a second link between the node and a UE. A waveform switch associated with the first link may be triggered by the base station or the node. A waveform switch associated with the second link may be triggered by the node or the UE. The waveform switch may correspond to a first switch from an OFDM waveform to an SC waveform or a second switch from the SC waveform to the OFDM waveform. The base station may transmit, to the node, an indication of a post-waveform switch resource mapping between a first waveform associated with the first link and a second waveform associated with the second link. The node may execute the waveform switch associated with the first link or the second link.

27 Claims, 17 Drawing Sheets

WAVEFORM SWITCHING MECHANISM FOR DIGITAL MMWAVE REPEATERS IN HIGHER BANDS

TECHNICAL FIELD

The present disclosure relates generally to communication systems, and more particularly, to waveform switching in connection with a repeater node in a wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus waveform switching in connection with a repeater node are provided. The apparatus may be a (repeater) node. The apparatus may identify a first indication of a waveform switch associated with a first link between a base station and the node or a second link between the node and a user equipment (UE). The waveform switch may correspond to a first switch from an orthogonal frequency division multiplexing (OFDM) waveform to a single carrier (SC) waveform or a second switch from the SC waveform to the OFDM waveform. The apparatus may execute the waveform switch associated with the first link or the second link.

In an aspect of the disclosure, a method, a computer-readable medium, and an apparatus waveform switching in connection with a repeater node are provided. The apparatus may be a base station. The apparatus may identify a first indication of a waveform switch associated with a first link between the base station and a node or a second link between the node and a UE. The waveform switch may correspond to a first switch from an OFDM waveform to an SC waveform or a second switch from the SC waveform to the OFDM waveform. The apparatus may transmit, to the node, an indication of a post-waveform switch resource mapping between a first waveform associated with the first link and a second waveform associated with the second link.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
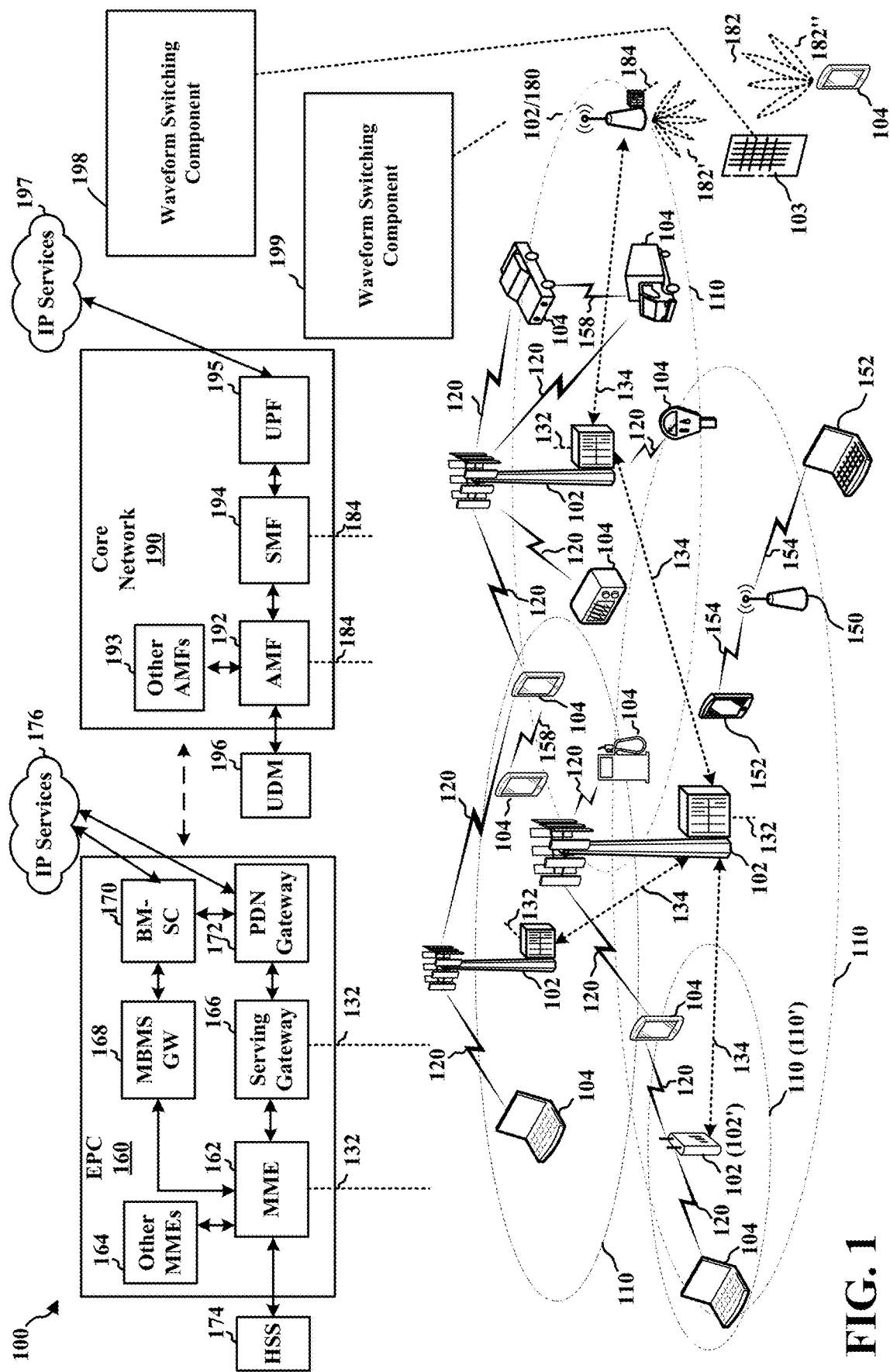
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the (repeater) node 103 may include a waveform switching component 198 that may be configured to identify a first indication of a waveform switch associated with a first link between a base station and the node or a second link between the node and a UE. The waveform switch may correspond to a first switch from an OFDM waveform to an SC waveform or a second switch from the SC waveform to the OFDM waveform. The waveform switching component 198 may be configured to execute the waveform switch associated with the first link or the second link. In certain aspects, the base station 180 may include a waveform switching component 199 that may be configured to identify a first indication of a waveform switch associated with a first link between the base station and a node or a second link between the node and a UE. The waveform switch may correspond to a first switch from an OFDM waveform to an SC waveform or a second switch from the SC waveform to the OFDM waveform. The waveform switching component 199 may be configured to transmit, to the node, an indication of a post-waveform switch resource mapping between a first waveform associated with the first link and a second waveform associated with the second link. Although the following description may be focused on 5G NR, the concepts described herein may be applicable to other similar areas, such as LTE, LTE-A, CDMA, GSM, and other wireless technologies.

Figure 2:
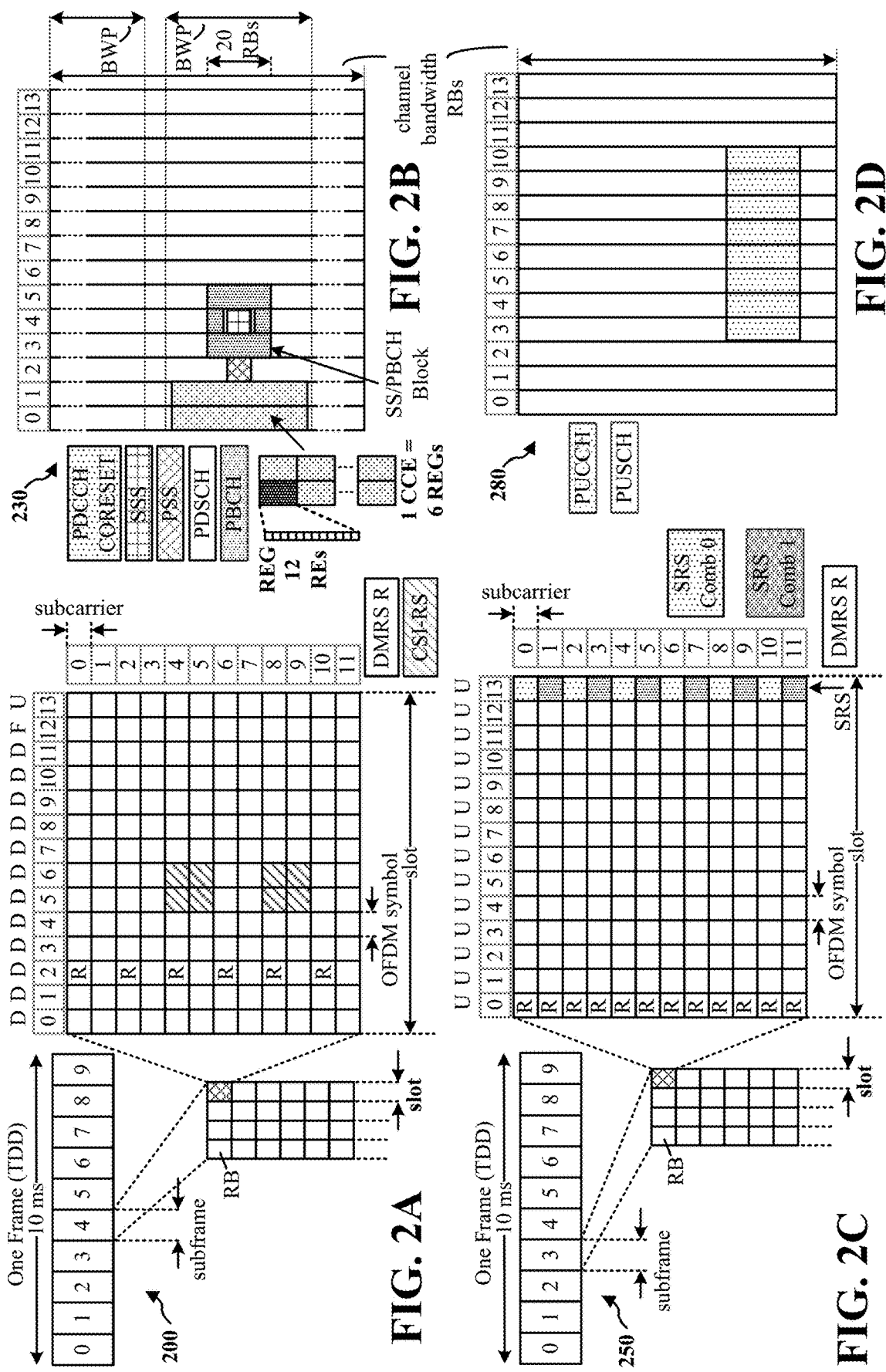
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS<br>$\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
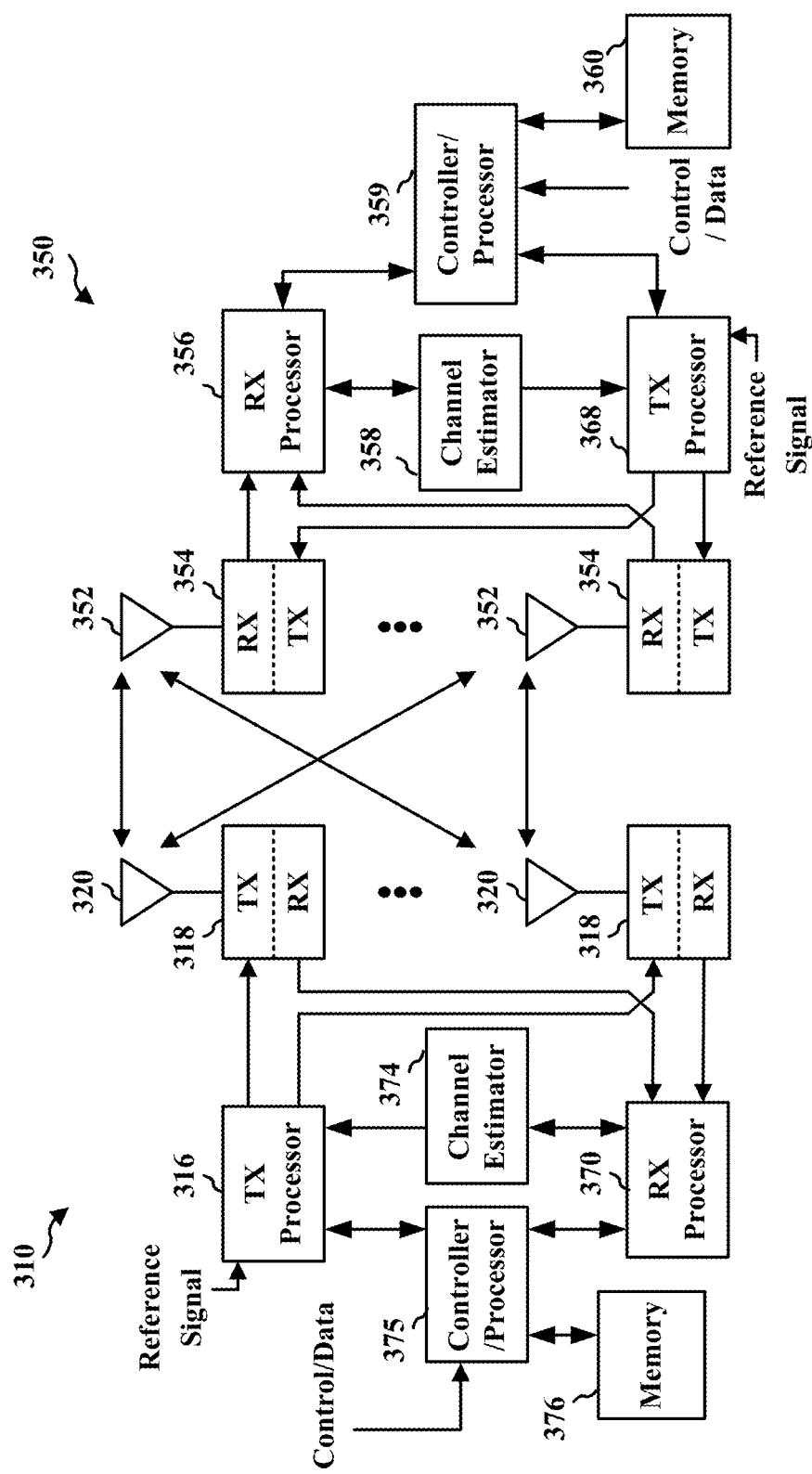
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with 199 of FIG. 1.

The OFDM-based waveform may be used for higher bands (e.g., FR4 and beyond), and may be backward compatible with the waveform choice for FR1/FR2/FR2x. In scenarios where the energy efficiency specification is more relaxed, the OFDM-based waveform may offer a high spectral efficiency. The SC waveform may be used for other scenarios that may specify a high energy efficiency. Hereinafter the SC waveform may refer to, for example, the SC-QAM waveform. With the SC waveform, the lower peak-to-average power ratio (PAPR) may translate into a higher power-added (PA) efficiency and an extended battery life. A high data rate may be achieved due to the massive spectrum availability.

Figure 4A:
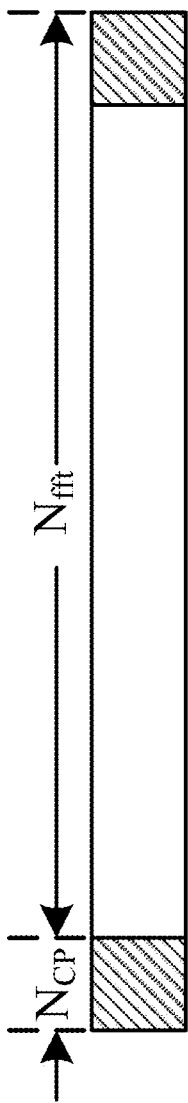
FIG. 4A is a diagram illustrating a composition of an SC waveform transmission including the CP.

To facilitate frequency domain equalization, the CP may be introduced into the SC waveform to create OFDM-like blocks or symbols. FIG. 4A is a diagram 400A illustrating a composition of an SC waveform transmission including the pre-appended CP. A guard interval (GI), sometime referred to as a unique word (UW), may be considered a special case of the CP in this context.

Both the OFDM and the SC waveforms may be used for higher bands. Slot-level alignment may be provided between the OFDM and the SC waveforms. Symbol-level alignment may be provided as well. Common numerologies, which may be associated with common sampling rates or common FFT sizes, may be used to enable a uniform transceiver design.

Figure 4B:
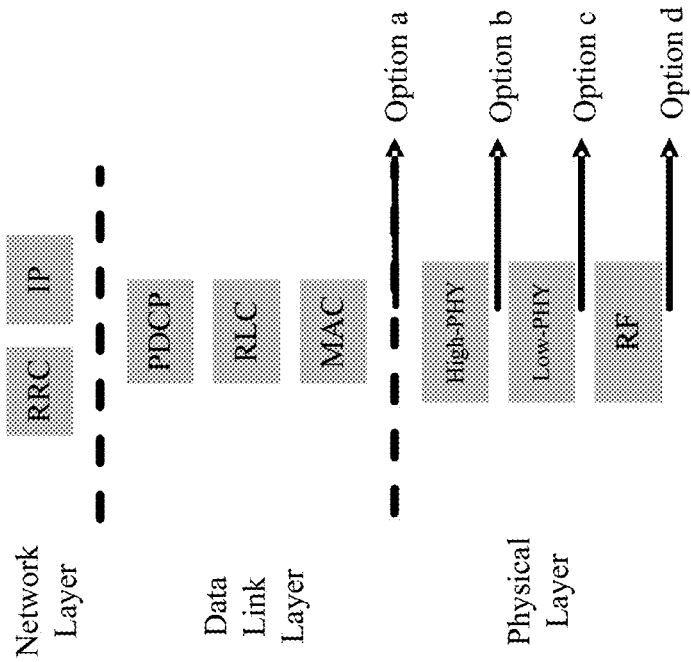
FIG. 4B is a diagram illustrating various split options associated with repeaters.

FIG. 4B is a diagram 400B illustrating various split options associated with repeaters. The repeaters may operate in a millimeter wave (mmWave) frequency range, and may be referred to as mmWave repeaters. An analog repeater may be based on the split option d (also known as the split option 9), which may operate below the RF layer, and may perform amplify and forward operations (in the analog domain). In contrast, a digital repeater may be based on the split option c through the split option a (also known as the split options 8, 7, and 6, respectively). In particular, the split option c may operate between the RF layer and the lower physical layer. The split option b may operate between the lower physical layer and the higher physical layer. The split option a may operate between the physical layer and the data link layer (in particular, between the higher physical layer and the MAC layer). The higher the layer the corresponding split option operates at, the more advanced the repeater may be. For example, a repeater based on the split option a may perform decoding and forwarding operations.

There may be a need for a waveform switch mechanism in digital mmWave repeaters for higher bands. The waveform switch may refer to a switch between the OFDM waveform and the SC waveform (i.e., either from the OFDM waveform to the SC waveform or from the SC waveform to the OFDM waveform). In higher bands, a waveform switch may be performed at a repeater for one or more of a number of reasons. The reasons may include, but are not limited to, UE capabilities, channel conditions or the operating band, phase noise or time-frequency errors, the power amplifier performance (the SC waveform is associated with a higher power amplifier efficiency), or the capability of the repeater to serve multiple UEs.

In some scenarios where digital mmWave repeaters are deployed, the link condition for the link between the base station and the repeater or the link condition for the link between the repeater and the UE may be improved through the switching of the waveforms. In such scenarios, a dynamic, semi-static, or static waveform switch may be triggered for improving or maintaining the link performance. Accordingly, one or more aspects may relate to a waveform switch mechanism in connection with a repeater including control signaling mechanisms. The waveform switch may be dynamic, semi-static, or static.

Figure 5A:
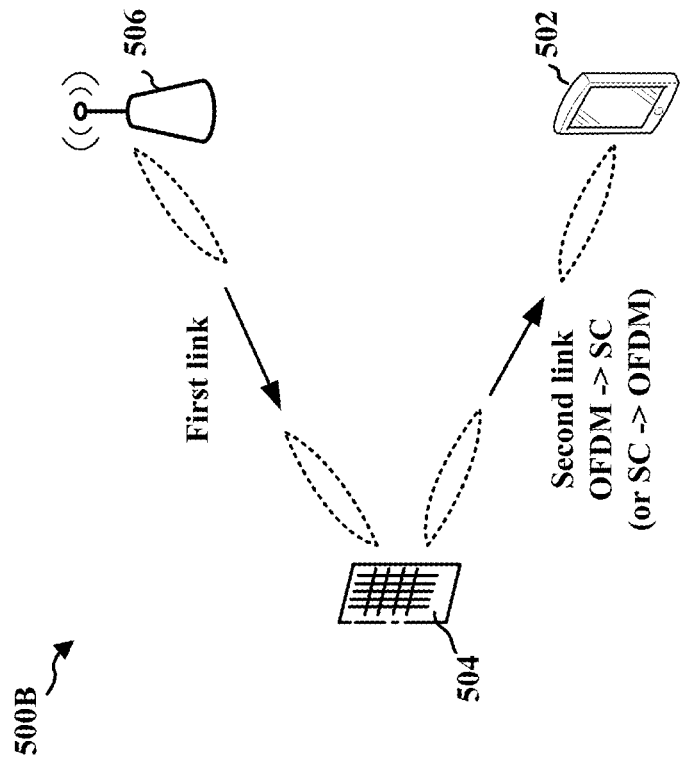
FIGS. 5A and 5B are diagrams illustrating example environments according to one or more aspects.
Figure 5B:
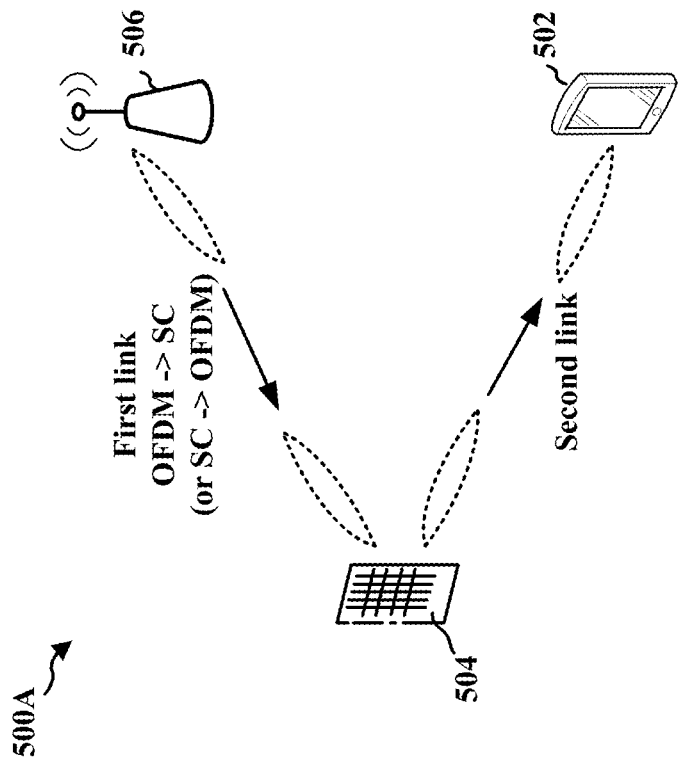

FIGS. 5A and 5B are diagrams illustrating example environments 500A and 500B according to one or more aspects. FIG. 5A illustrates waveform switching in the link between a base station 506 and a (repeater) node 504 (i.e., the first link). The link between the node 504 and the UE 502 may be referred to as the second link. In one example configuration, the node 504 may communicate with a UE 502 and the base station 506 with a default waveform, e.g., the OFDM waveform or the SC waveform. To maintain or improve the performance of the first link, a waveform switch for the first link may be performed. In particular, the waveform used for the first link may be switched from the OFDM waveform to the SC waveform (or from the SC waveform to the OFDM waveform). In different configurations, the waveform switch may be triggered by the node 504 or the base station 506.

In one example configuration, the default waveform for both the first link and the second link may be the OFDM waveform. After the waveform switch for the first link is triggered and executed, the waveform for the first link may switch from the OFDM waveform to the SC waveform. In the second link, the node 504 may continue to forward data using the default waveform (e.g., the OFDM waveform). For example, the node 504 may serve multiple UEs using OFDMA.

In another example configuration, the default waveform for both the first link and the second link may be the SC waveform. After the waveform switch for the first link is triggered and executed, the waveform for the first link may switch from the SC waveform to the OFDM waveform. In the second link, the node 504 may continue to forward data using the default waveform (e.g., the SC waveform).

FIG. 5B illustrates waveform switching in the second link. In one example configuration, a node 504 may communicate with a UE 502 and a base station 506 with a default waveform, e.g., the OFDM waveform or the SC waveform. To maintain or improve the performance of the second link, a waveform switch for the second link may be performed. In particular, the waveform used for the second link may be switched from the OFDM waveform to the SC waveform (or from the SC waveform to the OFDM waveform). In different configurations, the waveform switch may be triggered by the node 504 or the UE 502.

In one example configuration, the default waveform for both the first link and the second link may be the OFDM waveform. After the waveform switch for the second link is triggered and executed, the waveform for the second link may switch from the OFDM waveform to the SC waveform. In the first link, the base station 506 may continue to communicate with the node 504 using the default waveform (e.g., the OFDM waveform). If the node 504 serves multiple UEs and the waveform for the second link is switched from the OFDM waveform to the SC waveform, the base station 506 may provide an indication to the node 504, such that subsequent to the waveform switch the node 504 may buffer multiple slots (due to the time division multiplexing (TDM) associated with the SC waveform used in the second link after the waveform switch, where, e.g., each UE may be assigned one respective slot), rather than one slot (which may be acceptable when the UEs are frequency division multiplexed (FDMed) when the OFDM waveform is used).

In another example configuration, the default waveform for both the first link and the second link may be the SC waveform. After the waveform switch for the second link is triggered and executed, the waveform for the second link may switch from the SC waveform to the OFDM waveform. In the first link, the base station 506 may continue to communicate with the node 504 using the default waveform (e.g., the SC waveform). As part of the waveform switching procedure, the base station 506 may signal, to the node 504, a post-waveform switch resource mapping from the SC waveform used in the first link to the OFDM waveform used in the second link.

To execute the waveform switch (after receiving the proper signaling from the base station 506), the node 504 may perform a mapping from the time and frequency resources of the default waveform (e.g., the OFDM waveform) to the time and frequency resource of the new/switched waveform (e.g., the SC waveform). The base station 506 may transmit to the node 504 the details of the mapping via a fronthaul (FH)-PDCCH (FH-PDCCH) on the Uu link. After performing the mapping, the node 504 may utilizes the same RF chain for transmission of the new/switched waveform. Not all the blocks in the transmitter chain may be used. For example, if SC-QAM is the new/switched waveform, then the IFFT block may not be used.

In one example configuration, the OFDM waveform may be used on the Uu link (i.e., the first link) and the node 504 may serve multiple UEs on the access link (i.e., the second link) using the OFDM waveform. In this case, if the node 504 receives an indication of or triggers a waveform switch on the access link, first, the node 504 may receive data intended for the UEs on the Uu link from the base station 506 using the OFDM waveform. Next, the node 504 may perform the mapping from the time/frequency grid of the OFDM waveform to the time grid of the SC-QAM waveform. The node 504 may buffer data intended for the multiple UEs, and then transmit them based on TDM (or spatial division multiplexing (SDM), or code division multiplexing (CDM)) since the SC-QAM waveform may not accommodate FDM.

Figure 6:
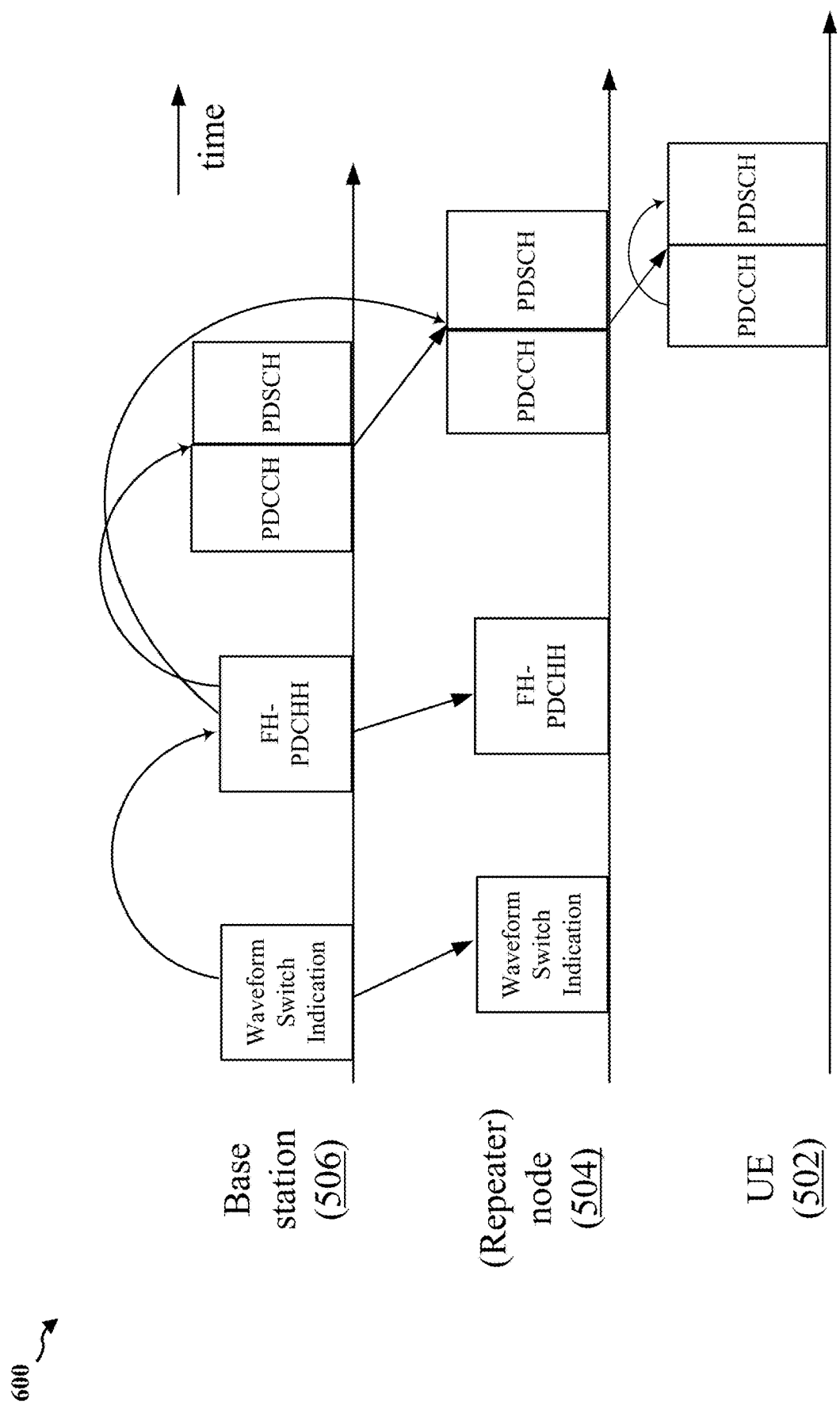
FIG. 6 is a diagram illustrating a signaling mechanism associated with a waveform switch in the first link.

FIG. 6 is a diagram 600 illustrating a signaling mechanism associated with a waveform switch in the first link. The waveform switch may be triggered by the base station 506. The base station 506 may signal the waveform switch to the node 504 via dedicated signaling (e.g., an RRC message or a MAC-control element (CE) (MAC-CE)). An FH-PDCCH may be a physical layer control channel between the base station 506 and the node 504. In this configuration, because the indication of the waveform switch is signaled via dedicated signaling (e.g., an RRC message or a MAC-CE), the FH-PDCCH may not contain the waveform switch information, as the waveform switch information is communicated through the dedicated signaling. The waveform switch information may include information about how the node 504 may, after the waveform switch, map resources in both time and frequency for the waveform used in the second link. Subsequent to the waveform switch in the first link, the node 504 may proceed to receive, from the base station 506, one or more PDCCHs and/or PDSCHs intended for one or more UEs 502 using the new waveform in the first link, and may forward the one or more PDCCHs and/or PDSCHs to the one or more UEs 502. The node 504 may receive and forward the uplink channels in a similar fashion (e.g., using the existing waveform in the second link and the new waveform in the first link).

Figure 7:
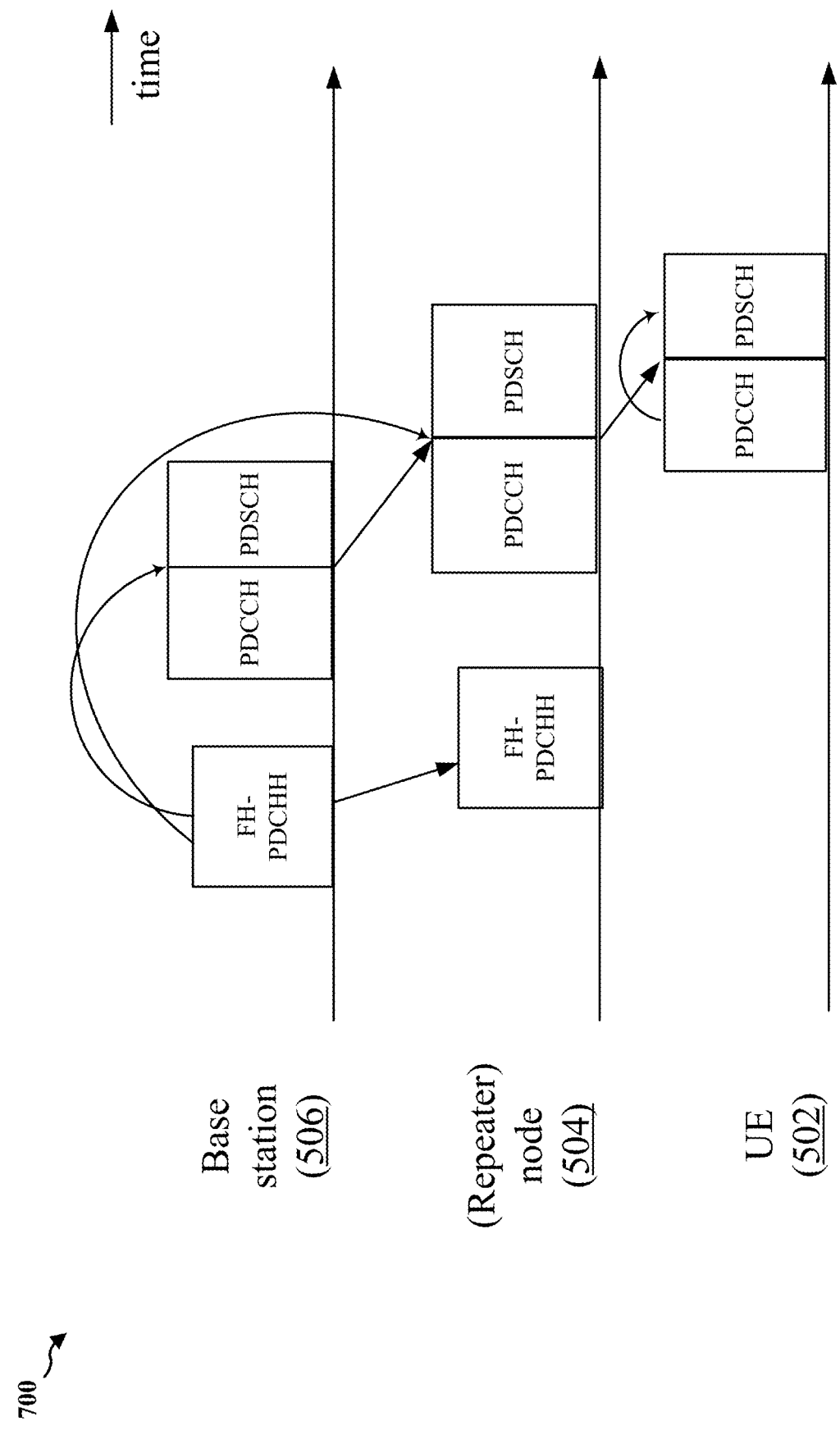
FIG. 7 is a diagram illustrating a signaling mechanism associated with a waveform switch in the first link.

FIG. 7 is a diagram 700 illustrating a signaling mechanism associated with a waveform switch in the first link. The waveform switch may be triggered by the base station 506. The base station 506 may signal the waveform switch to the node 504 via an FH-PDCCH. The base station 506 may transmit the FH-PDCCH to the node 504 using the default waveform (e.g., the OFDM waveform) (i.e., the waveform used prior to the waveform switch). The FH-PDCCH may include an indication of the waveform switch. The FH-PDCCH may further include a resource mapping between the waveform used in the first link and the waveform used in the second link post-waveform switch. For example, in one configuration, if the node 504 serves multiple UEs 502 using the default OFDM waveform in the second link, and the waveform for the first link is to be switched from the OFDM waveform to the SC waveform based on a trigger provided by the base station 506, the base station 506 may include in the FH-PDCCH information about how the node 504 may, after the waveform switch, map resources in both time and frequency for the OFDM waveform used in the second link.

After receiving and decoding the FH-PDCCH, the node 504 may monitor for and observe the waveform switch trigger. The node 504 may switch the waveform in the first link, and may proceed to receive, from the base station 506, one or more PDCCHs and/or PDSCHs intended for one or more UEs 502 using the new waveform, and may forward the one or more PDCCHs and/or PDSCHs to the one or more UEs 502. The node 504 may receive and forward the uplink channels in a similar fashion (e.g., using the existing waveform in the second link and the new waveform in the first link).

Figure 8:
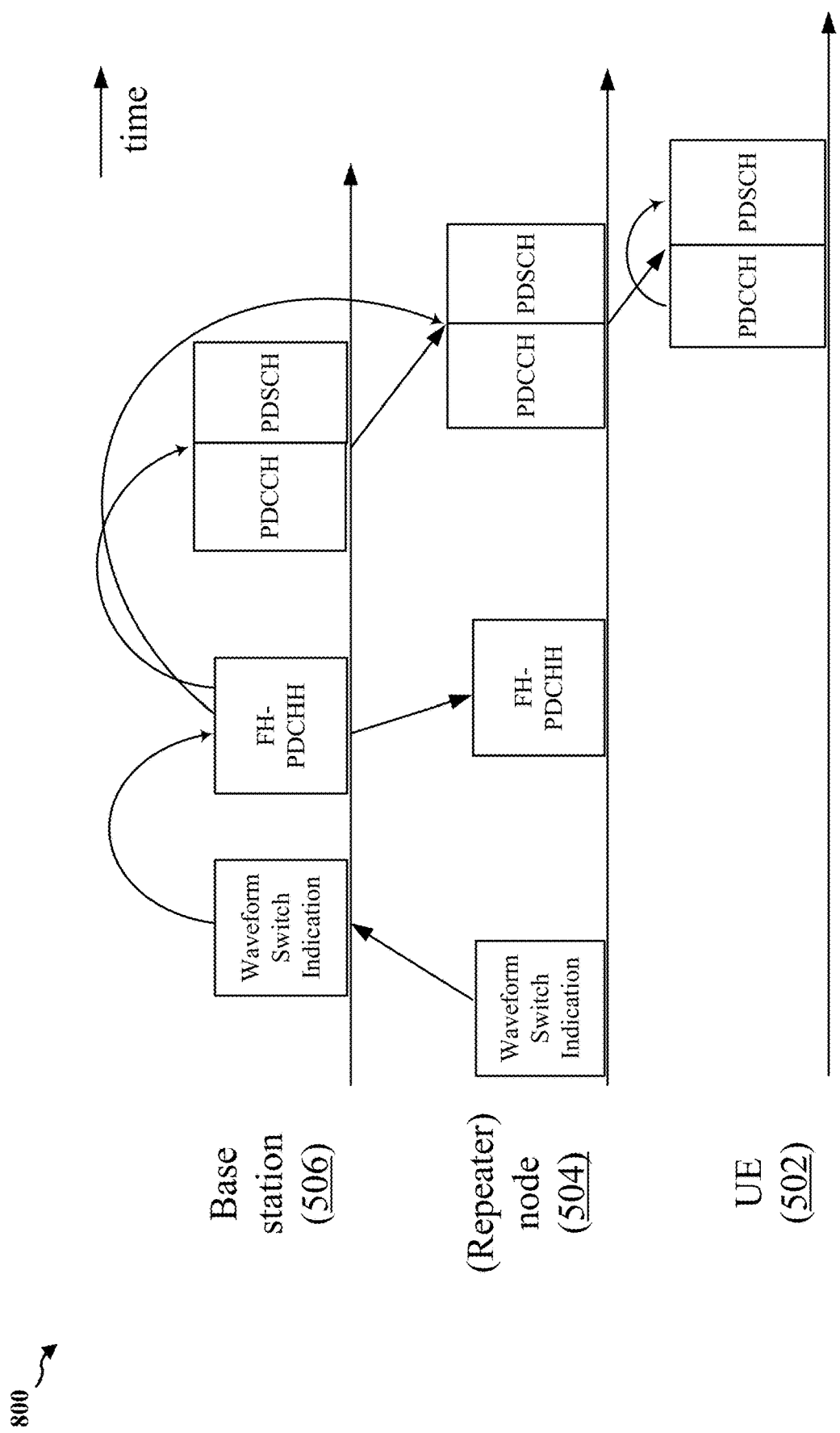
FIG. 8 is a diagram illustrating a signaling mechanism associated with a waveform switch in the first link.

FIG. 8 is a diagram 800 illustrating a signaling mechanism associated with a waveform switch in the first link. The waveform switch may be triggered by the node 504. The node 504 may signal the waveform switch to the base station 506 via FH feedback signaling (e.g., via an FH-PUCCH). In response to the indication of the waveform switch from the node 504, the base station 506 may transmit an FH-PDCCH to the node 504 using the default waveform (e.g., the OFDM waveform) (i.e., the waveform used prior to the waveform switch). The FH-PDCCH may include a resource mapping between the waveform used in the first link and the waveform used in the second link post-waveform switch. For example, in one configuration, if the node 504 serves multiple UEs 502 using the default OFDM waveform in the second link, and the waveform for the first link is to be switched from the OFDM waveform to the SC waveform based on a trigger provided by the node 504, the base station 506 may include in the FH-PDCCH information about how the node 504 may, after the waveform switch, map resources in both time and frequency for the OFDM waveform used in the second link. Upon receiving and decoding the FH-PDCCH including the resource mapping information, the node 504 may then switch the waveform in the first link, and may proceed to receive, from the base station 506, one or more PDCCHs and/or PDSCHs intended for one or more UEs 502 using the new waveform, and may forward the one or more PDCCHs and/or PDSCHs to the one or more UEs 502. The node 504 may receive and forward the uplink channels in a similar fashion (e.g., using the existing waveform in the second link and the new waveform in the first link).

Figure 9:
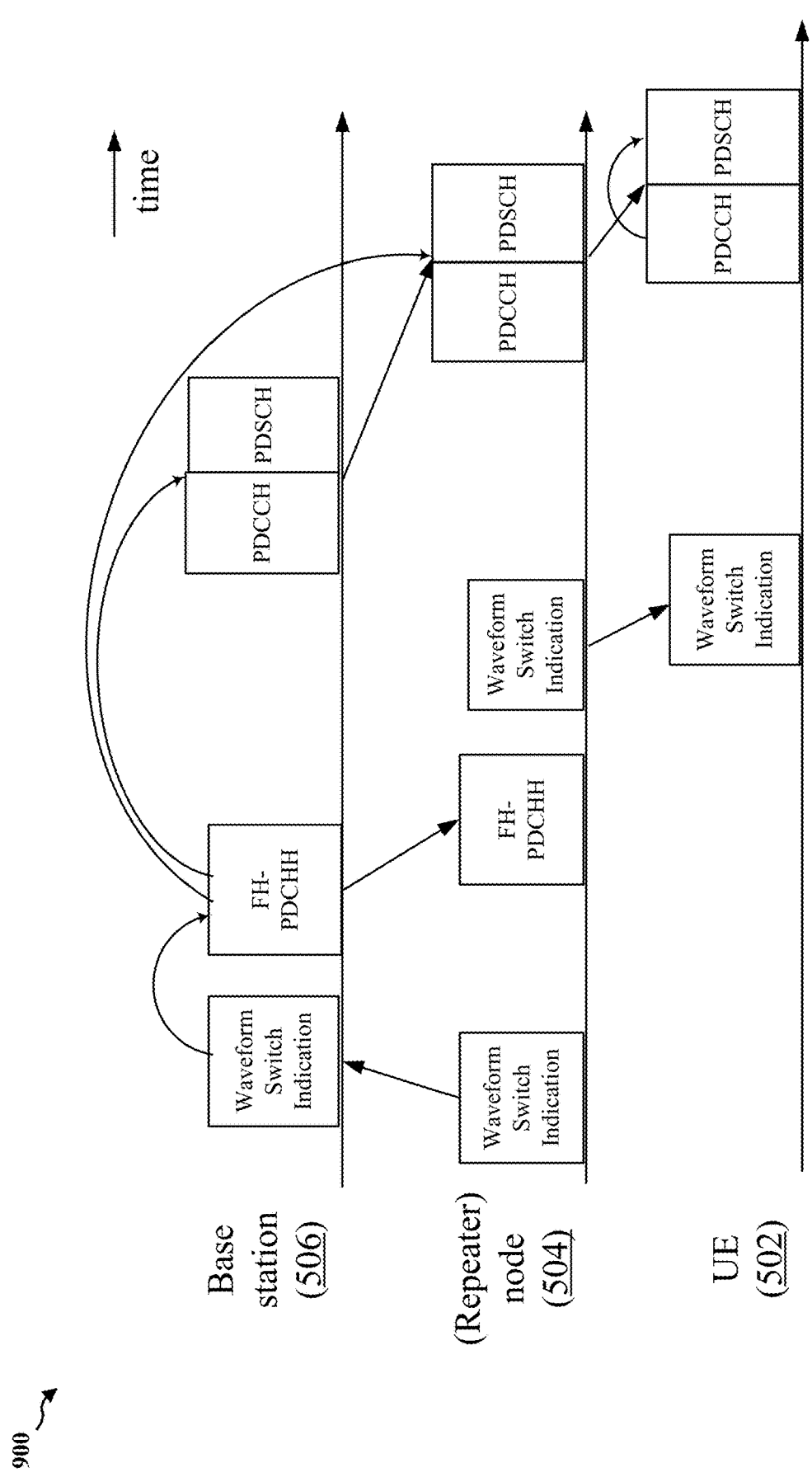
FIG. 9 is a diagram illustrating a signaling mechanism associated with a waveform switch in the second link.

FIG. 9 is a diagram 900 illustrating a signaling mechanism associated with a waveform switch in the second link. The waveform switch may be triggered by the node 504. The node 504 may signal the waveform switch in the second link to the base station 506 via FH feedback signaling. In response to the indication of the waveform switch from the node 504, the base station 506 may transmit an FH-PDCCH to the node 504. The FH-PDCCH may include a resource mapping between the waveform used in the first link and the waveform used in the second link post-waveform switch. Upon receiving and decoding the FH-PDCCH including the resource mapping information, the node 504 may signal the waveform switch to the UE 502 via dedicated signaling (e.g., using the pre-waveform switch waveform). The dedicated signaling may include the waveform switch indication for the waveform switch in the second link. The node 504 may then switch the waveform in the second link, and may proceed to forward one or more PDCCHs and/or PDSCHs intended for one or more UEs 502 using the new waveform in the second link. The node 504 may receive and forward the uplink channels in a similar fashion (e.g., using the new waveform in the second link and the existing waveform in the first link).

Figure 10:
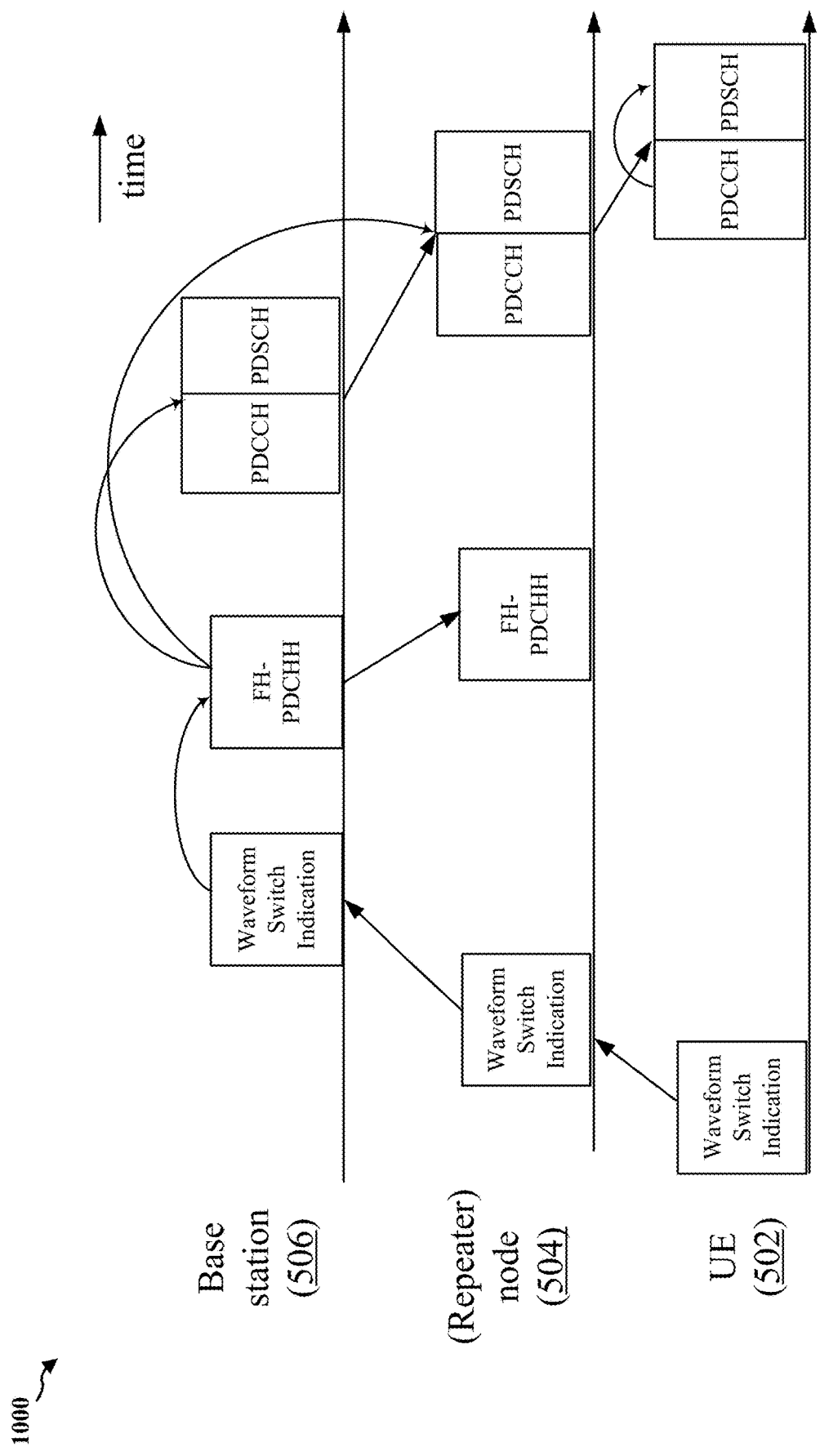
FIG. 10 is a diagram illustrating a signaling mechanism associated with a waveform switch in the second link.

FIG. 10 is a diagram 1000 illustrating a signaling mechanism associated with a waveform switch in the second link. The waveform switch may be triggered by the UE 502. The UE 502 may signal the waveform switch to the node 504 via dedicated signaling (e.g., using the pre-waveform switch waveform). The dedicated signaling may include the waveform switch indication for the waveform switch in the second link. Upon receiving the indication of the waveform switch from the UE 502, the node 504 may signal the waveform switch to the base station 506 via FH feedback signaling. In response to the indication of the waveform switch from the node 504, the base station 506 may transmit an FH-PDCCH to the node 504. The FH-PDCCH may include a resource mapping between the waveform used in the first link and the waveform used in the second link post-waveform switch. Upon receiving and decoding the FH-PDCCH including the resource mapping information, the node 504 may switch the waveform in the second link, and may proceed to forward one or more PDCCHs and/or PDSCHs intended for one or more UEs 502 using the new waveform in the second link. The node 504 may receive and forward the uplink channels in a similar fashion (e.g., using the new waveform in the second link and the existing waveform in the first link).

Figure 11:
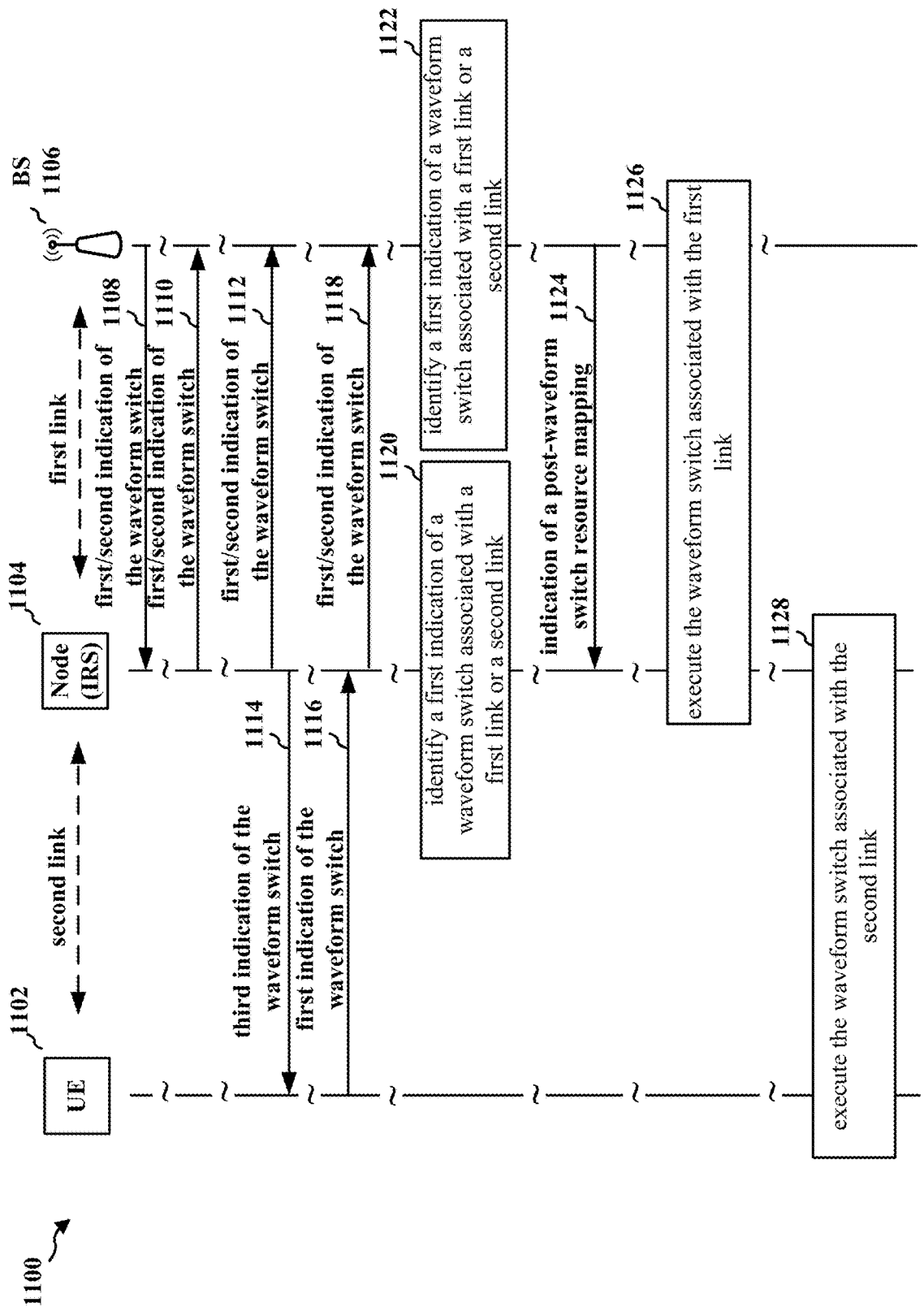
FIG. 11 is a diagram illustrating a communication flow of a method of wireless communication.

FIG. 11 is a diagram illustrating a communication flow 1100 of a method of wireless communication. The UE 1102 may correspond to the UE 104/350/502. The (repeater) node 1104 may correspond to the node 103/504. The base station 1106 may correspond to the base station 102/180/310/506. In one configuration, a waveform switch in the first link between the base station 506 and the node 504 may be triggered by the base station 506. The waveform switch may correspond to a first switch from an OFDM waveform to an SC waveform or a second switch from the SC waveform to the OFDM waveform. At 1122, the base station 1106 may identify a first indication of a waveform switch associated with a first link between the base station 1106 and a node 1104. At 1108, the base station 1106 may transmit, to the node 1104, and the node 1104 may receive, from the base station 1106, a first/second indication of the waveform switch. The first/second indication of the waveform switch 1108 may be transmitted and received via dedicated signaling (e.g., an RRC message or a MAC-CE) or an FH-PDCCH. At 1120, the node 1104 may identify a first indication of a waveform switch associated with a first link between a base station 1106 and the node 1104. At 1124, the base station 1106 may transmit, to the node 1104, and the node 1104 may receive, from the base station 1106, an indication of a post-waveform switch resource mapping between a first waveform associated with the first link and a second waveform associated with the second link. The post-waveform switch resource mapping 1124 may be transmitted and received via dedicated signaling (e.g., an RRC message or a MAC-CE) or an FH-PDCCH. At 1126, the node 1104 and the base station 1106 may execute the waveform switch associated with the first link.

In one configuration, a waveform switch in the first link between the base station 506 and the node 504 may be triggered by the node 504. The waveform switch may correspond to a first switch from an OFDM waveform to an SC waveform or a second switch from the SC waveform to the OFDM waveform. At 1120, the node 1104 may identify a first indication of a waveform switch associated with a first link between a base station 1106 and the node 1104. At 1110, the node 1104 may transmit, to the base station 1106, and the base station 1106 may receive, from the node 1104, a first/second indication of the waveform switch via an FH feedback message. The first/second indication of the waveform switch 1110 may be transmitted and received via an FH feedback message. At 1122, the base station 1106 may identify a first indication of a waveform switch associated with a first link between the base station 1106 and a node 1104. At 1124, the base station 1106 may transmit, to the node 1104, and the node 1104 may receive, from the base station 1106, an indication of a post-waveform switch resource mapping between a first waveform associated with the first link and a second waveform associated with the second link. The post-waveform switch resource mapping 1124 may be transmitted and received via an FH-PDCCH. At 1126, the node 1104 and the base station 1106 may execute the waveform switch associated with the first link.

In one configuration, a waveform switch in the second link between the node 504 and the UE 502 may be triggered by the node 504. The waveform switch may correspond to a first switch from an OFDM waveform to an SC waveform or a second switch from the SC waveform to the OFDM waveform. At 1120, the node 1104 may identify a first indication of a waveform switch associated with a second link between the node 1104 and a UE 1102. At 1112, the node 1104 may transmit, to the base station 1106, and the base station 1106 may receive, from the node 1104, a first/second indication of the waveform switch. The first/second indication of the waveform switch 1112 may be transmitted and received via an FH feedback message. At 1114, the node 1104 may transmit, to the UE 1102, a third indication of the waveform switch. The third indication of the waveform switch 1114 may be transmitted via dedicated signaling. At 1122, the base station 1106 may identify a first indication of a waveform switch associated with a second link between the node 1104 and a UE 1102. At 1124, the base station 1106 may transmit, to the node 1104, and the node 1104 may receive, from the base station 1106, an indication of a post-waveform switch resource mapping between a first waveform associated with the first link and a second waveform associated with the second link. The post-waveform switch resource mapping 1124 may be transmitted and received via an FH-PDCCH. At 1128, the node 1104 and the UE 1102 may execute the waveform switch associated with the second link.

In one configuration, a waveform switch in the second link between the node 504 and the UE 502 may be triggered by the UE 502. The waveform switch may correspond to a first switch from an OFDM waveform to an SC waveform or a second switch from the SC waveform to the OFDM waveform. At 1116, the node 1104 may receive, from the UE 1102, the first indication of the waveform switch. The first indication of the waveform switch 1116 may be received via dedicated signaling. At 1120, the node 1104 may identify a first indication of a waveform switch associated with a second link between the node 1104 and a UE 1102. At 1118, the node 1104 may transmit, to the base station 1106, and the base station 1106 may receive, from the node 1104, a first/second indication of the waveform switch. The first/ second indication of the waveform switch 1118 may be transmitted and received via an FH feedback message. At 1122, the base station 1106 may identify a first indication of a waveform switch associated with a second link between the node 1104 and a UE 1102. At 1124, the base station 1106 may transmit, to the node 1104, and the node 1104 may receive, from the base station 1106, an indication of a post-waveform switch resource mapping between a first waveform associated with the first link and a second waveform associated with the second link. The post-waveform switch resource mapping 1124 may be transmitted and received via an FH-PDCCH. At 1128, the node 1104 and the UE 1102 may execute the waveform switch associated with the second link.

In another configuration, a waveform switch in the second link between the node 504 and the UE 502 may be triggered by the base station 506.

Figure 12:
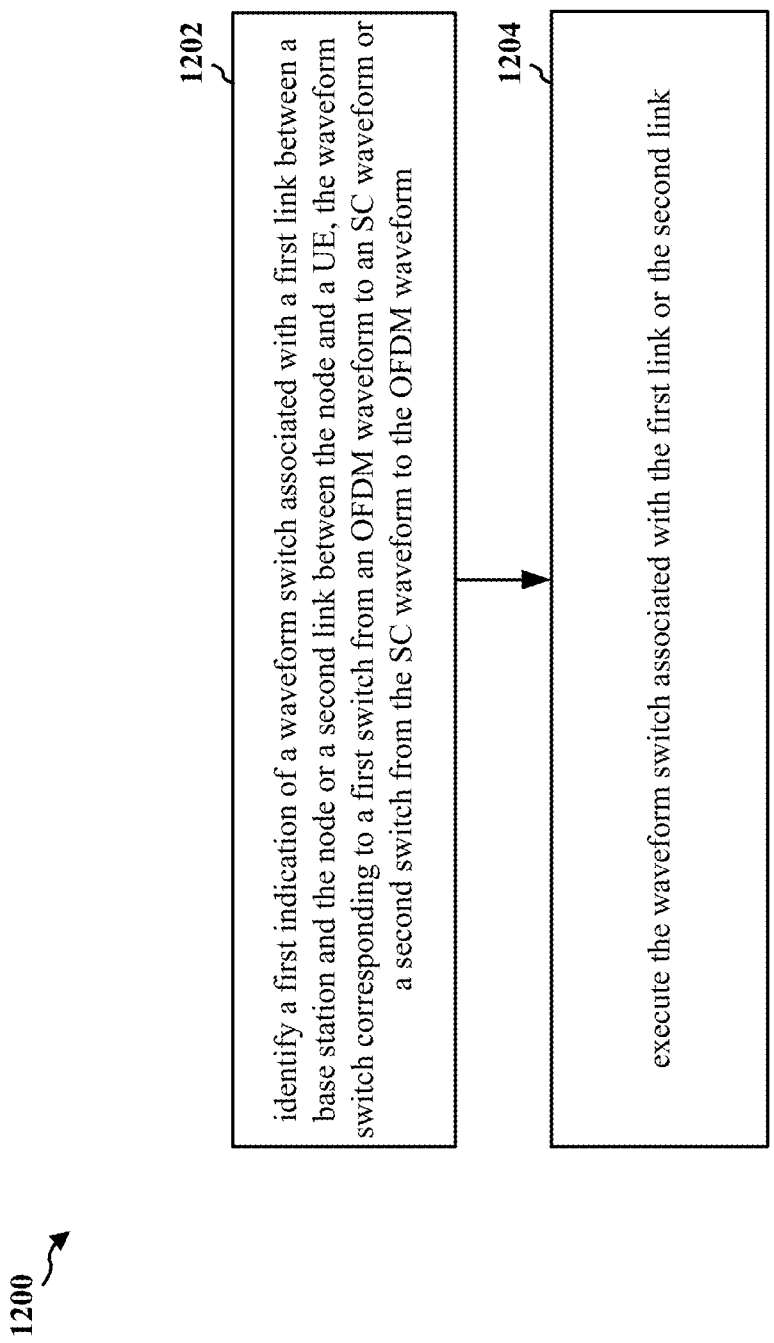
FIG. 12 is a flowchart of a method of wireless communication.

FIG. 12 is a flowchart 1200 of a method of wireless communication. The method may be performed by a (repeater) node (e.g., the node 103/504/1104; the apparatus 1602). At 1202, the node may identify a first indication of a waveform switch associated with a first link between a base station and the node or a second link between the node and a UE. The waveform switch may correspond to a first switch from an OFDM waveform to an SC waveform or a second switch from the SC waveform to the OFDM waveform. For example, 1202 may be performed by the waveform switching component 1640 in FIG. 16. Referring to FIG. 11, at 1120, the node 1104 may identify a first indication of a waveform switch associated with a first link between a base station 1106 and the node 1104 or a second link between the node 1104 and a UE 1102.

At 1204, the node may execute the waveform switch associated with the first link or the second link. For example, 1204 may be performed by the waveform switching component 1640 in FIG. 16. Referring to FIG. 11, at 1126 or 1128, the node 1104 may execute the waveform switch associated with the first link or the second link.

Figure 13:
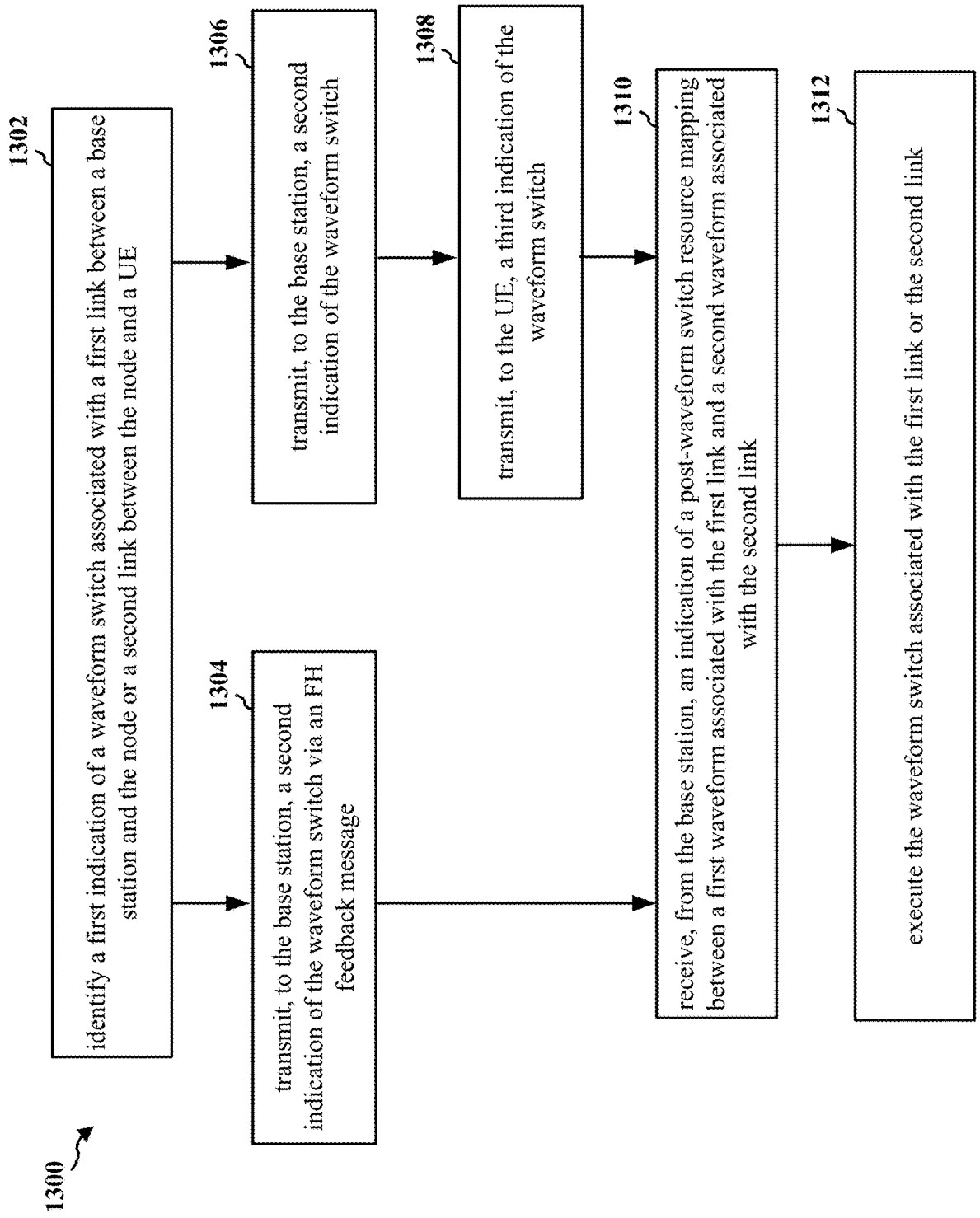
FIG. 13 is a flowchart of a method of wireless communication.

FIG. 13 is a flowchart 1300 of a method of wireless communication. The method may be performed by a (repeater) node (e.g., the node 103/504/1104; the apparatus 1602). At 1302, the node may identify a first indication of a waveform switch associated with a first link between a base station and the node or a second link between the node and a UE. The waveform switch may correspond to a first switch from an OFDM waveform to an SC waveform or a second switch from the SC waveform to the OFDM waveform. For example, 1302 may be performed by the waveform switching component 1640 in FIG. 16. Referring to FIG. 11, at 1120, the node 1104 may identify a first indication of a waveform switch associated with a first link between a base station 1106 and the node 1104 or a second link between the node 1104 and a UE 1102.

At 1312, the node may execute the waveform switch associated with the first link or the second link. For example, 1312 may be performed by the waveform switching component 1640 in FIG. 16. Referring to FIG. 11, at 1126 or 1128, the node 1104 may execute the waveform switch associated with the first link or the second link.

In one configuration, the waveform switch may be associated with the first link.

In one configuration, referring back to FIG. 11, the first indication of the waveform switch 1108 may be received from the base station 1106.

In one configuration, referring back to FIG. 11, the first indication of the waveform switch 1108 may be received from the base station 1106 via an RRC message or a MAC-CE.

In one configuration, referring back to FIG. 11, the first indication of the waveform switch 1108 may be received from the base station 1106 via an FH-PDCCH.

In one configuration, referring back to FIG. 11, the first indication of the waveform switch may be generated at the node 1104.

In one configuration, at 1304, the node may transmit, to the base station, a second indication of the waveform switch via an FH feedback message. For example, 1304 may be performed by the waveform switching component 1640 in FIG. 16. Referring to FIG. 11, at 1110, the node 1104 may transmit, to the base station 1106, a second indication of the waveform switch via an FH feedback message.

In one configuration, the waveform switch may be associated with the second link.

In one configuration, referring back to FIG. 11, the first indication of the waveform switch may be generated at the node 1104.

In one configuration, at 1306, the node may transmit, to the base station, a second indication of the waveform switch. For example, 1306 may be performed by the waveform switching component 1640 in FIG. 16. Referring to FIG. 11, at 1112, the node 1104 may transmit, to the base station 1106, a second indication of the waveform switch. At 1308, the node may transmit, to the UE, a third indication of the waveform switch. For example, 1308 may be performed by the waveform switching component 1640 in FIG. 16. Referring to FIG. 11, at 1114, the node 1104 may transmit, to the UE 1102, a third indication of the waveform switch.

In one configuration, referring back to FIG. 11, the second indication of the waveform switch 1112 may be transmitted to the base station 1106 via an FH feedback message.

In one configuration, referring back to FIG. 11, the first indication of the waveform switch 1116 may be received from the UE 1102.

In one configuration, at 1306, the node may transmit, to the base station, a second indication of the waveform switch. For example, 1306 may be performed by the waveform switching component 1640 in FIG. 16. Referring to FIG. 11, at 1118, the node 1104 may transmit, to the base station 1106, a second indication of the waveform switch.

In one configuration, referring back to FIG. 11, the second indication of the waveform switch 1118 may be transmitted to the base station 1106 via an FH feedback message.

In one configuration, at 1310, the node may receive, from the base station, an indication of a post-waveform switch resource mapping between a first waveform associated with the first link and a second waveform associated with the second link. For example, 1310 may be performed by the waveform switching component 1640 in FIG. 16. Referring to FIG. 11, at 1124, the node 1104 may receive, from the base station 1106, an indication of a post-waveform switch resource mapping between a first waveform associated with the first link and a second waveform associated with the second link.

In one configuration, referring back to FIG. 11, the indication of the post-waveform switch resource mapping 1124 may be received from the base station 1106 via an FH-PDCCH.

Figure 14:
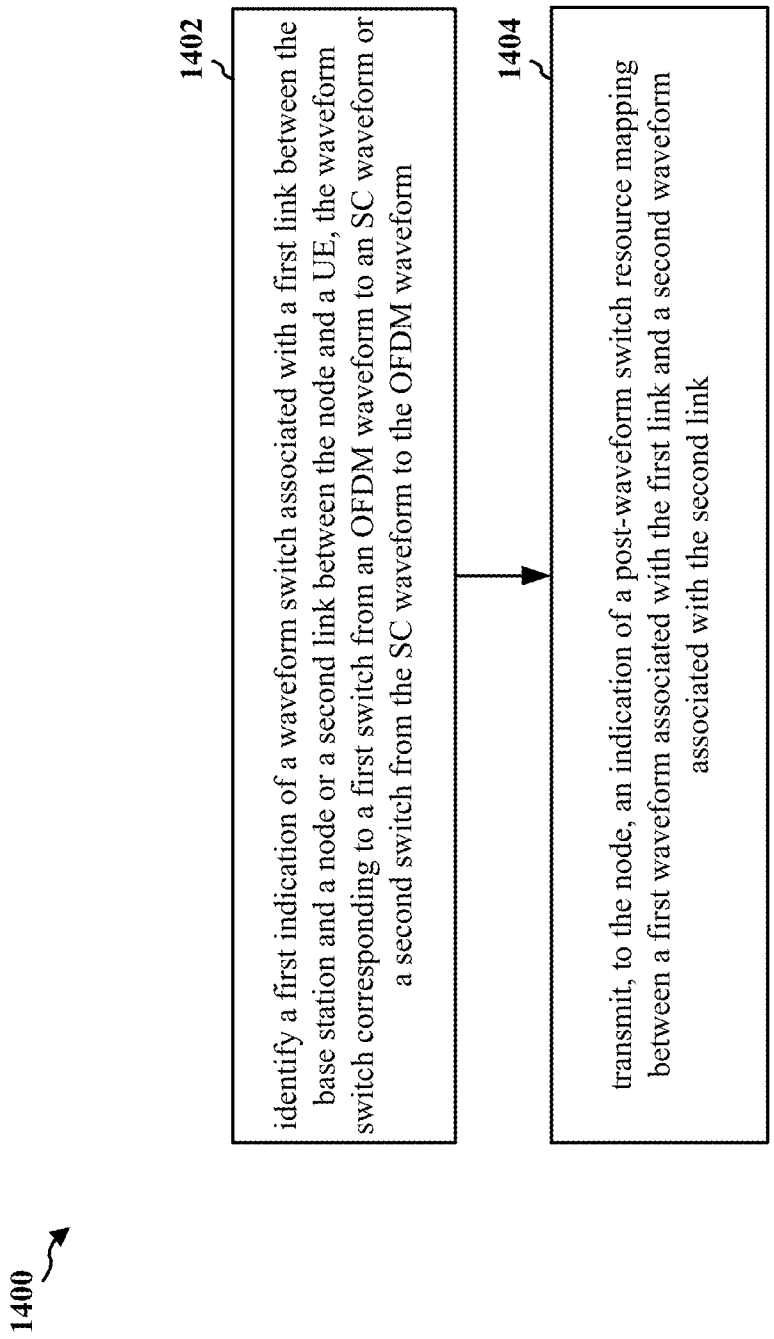
FIG. 14 is a flowchart of a method of wireless communication.

FIG. 14 is a flowchart 1400 of a method of wireless communication. The method may be performed by a base station (e.g., the base station 102/180/310/506/1106; the apparatus 1702). At 1402, the base station may identify a first indication of a waveform switch associated with a first link between the base station and a node or a second link between the node and a UE. The waveform switch may correspond to a first switch from an OFDM waveform to an SC waveform or a second switch from the SC waveform to the OFDM waveform. For example, 1402 may be performed by the waveform switching component 1740 in FIG. 17. Referring to FIG. 11, at 1122, the base station 1106 may identify a first indication of a waveform switch associated with a first link between the base station 1106 and a node 1104 or a second link between the node 1104 and a UE 1102.

At 1404, the base station may transmit, to the node, an indication of a post-waveform switch resource mapping between a first waveform associated with the first link and a second waveform associated with the second link. For example, 1404 may be performed by the waveform switching component 1740 in FIG. 17. Referring to FIG. 11, at 1124, the base station 1106 may transmit, to the node 1104, an indication of a post-waveform switch resource mapping between a first waveform associated with the first link and a second waveform associated with the second link.

Figure 15:
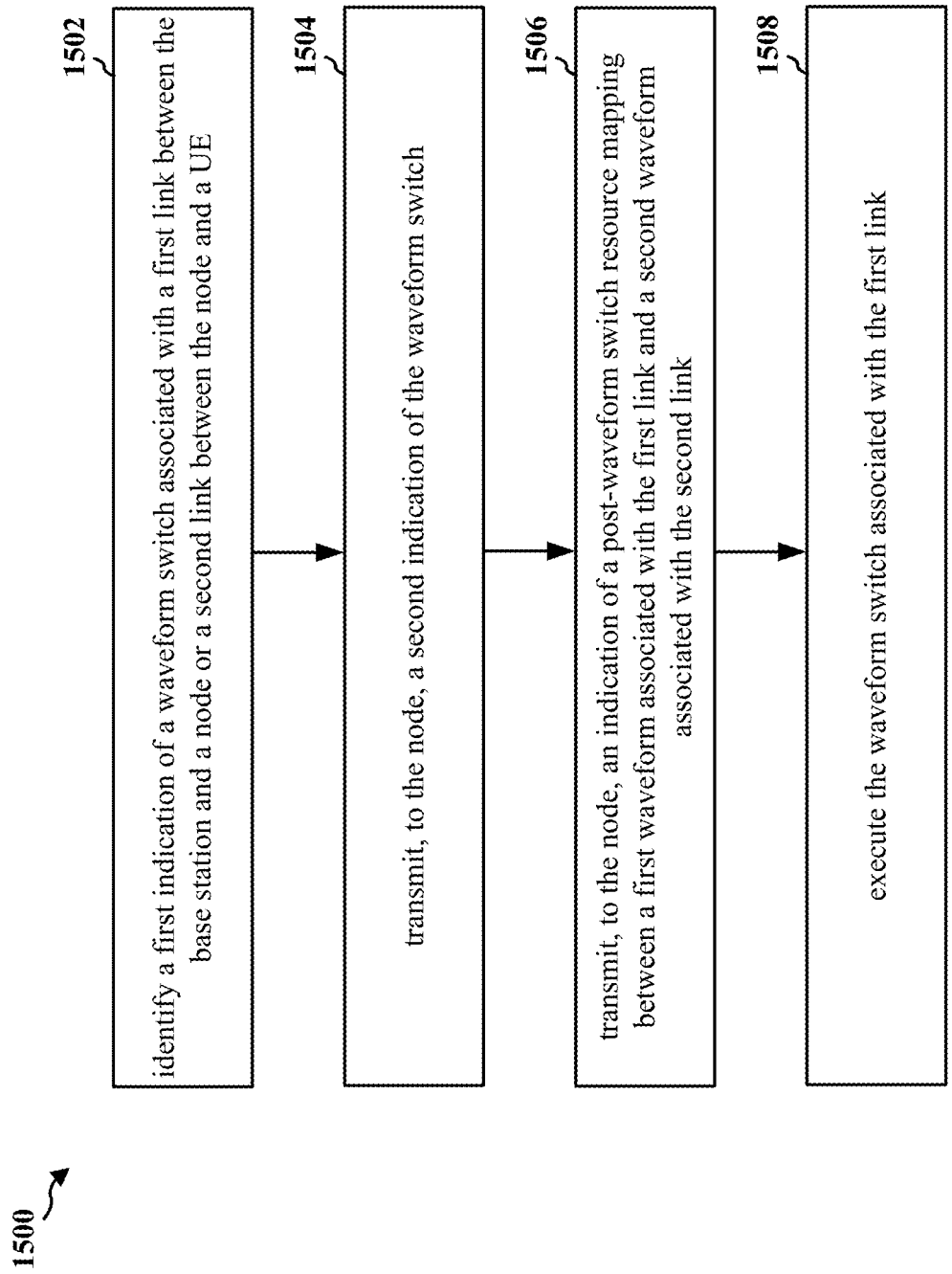
FIG. 15 is a flowchart of a method of wireless communication.

FIG. 15 is a flowchart 1500 of a method of wireless communication. The method may be performed by a base station (e.g., the base station 102/180/310/506/1106; the apparatus 1702). At 1502, the base station may identify a first indication of a waveform switch associated with a first link between the base station and a node or a second link between the node and a UE. The waveform switch may correspond to a first switch from an OFDM waveform to an SC waveform or a second switch from the SC waveform to the OFDM waveform. For example, 1502 may be performed by the waveform switching component 1740 in FIG. 17. Referring to FIG. 11, at 1122, the base station 1106 may identify a first indication of a waveform switch associated with a first link between the base station 1106 and a node 1104 or a second link between the node 1104 and a UE 1102.

At 1506, the base station may transmit, to the node, an indication of a post-waveform switch resource mapping between a first waveform associated with the first link and a second waveform associated with the second link. For example, 1506 may be performed by the waveform switching component 1740 in FIG. 17. Referring to FIG. 11, at 1124, the base station 1106 may transmit, to the node 1104, an indication of a post-waveform switch resource mapping between a first waveform associated with the first link and a second waveform associated with the second link.

In one configuration, the waveform switch may be associated with the first link.

In one configuration, at 1508, the base station may execute the waveform switch associated with the first link. For example, 1508 may be performed by the waveform switching component 1740 in FIG. 17. Referring to FIG. 11, at 1126, the base station 1106 may execute the waveform switch associated with the first link.

In one configuration, referring back to FIG. 11, the first indication of the waveform switch may be generated at the base station 1106. At 1504, the base station may transmit, to the node, a second indication of the waveform switch. For example, 1504 may be performed by the waveform switching component 1740 in FIG. 17. Referring to FIG. 11, at 1108, the base station 1106 may transmit, to the node 1104, a second indication of the waveform switch.

In one configuration, referring back to FIG. 11, the second indication of the waveform switch 1108 may be transmitted to the node 1104 via an RRC message or MAC-CE.

In one configuration, referring back to FIG. 11, the second indication of the waveform switch 1108 may be transmitted to the node 1104 via an FH-PDCCH.

In one configuration, referring back to FIG. 11, the first indication of the waveform switch 1110 may be received from the node 1104 via an FH feedback message.

In one configuration, the waveform switch may be associated with the second link.

In one configuration, referring back to FIG. 11, the first indication of the waveform switch 1118 may be received from the node 1104 via an FH feedback message.

In one configuration, referring back to FIG. 11, the indication of the post-waveform switch resource mapping 1124 may be transmitted to the node 1104 via an FH-PDCCH.

Figure 16:
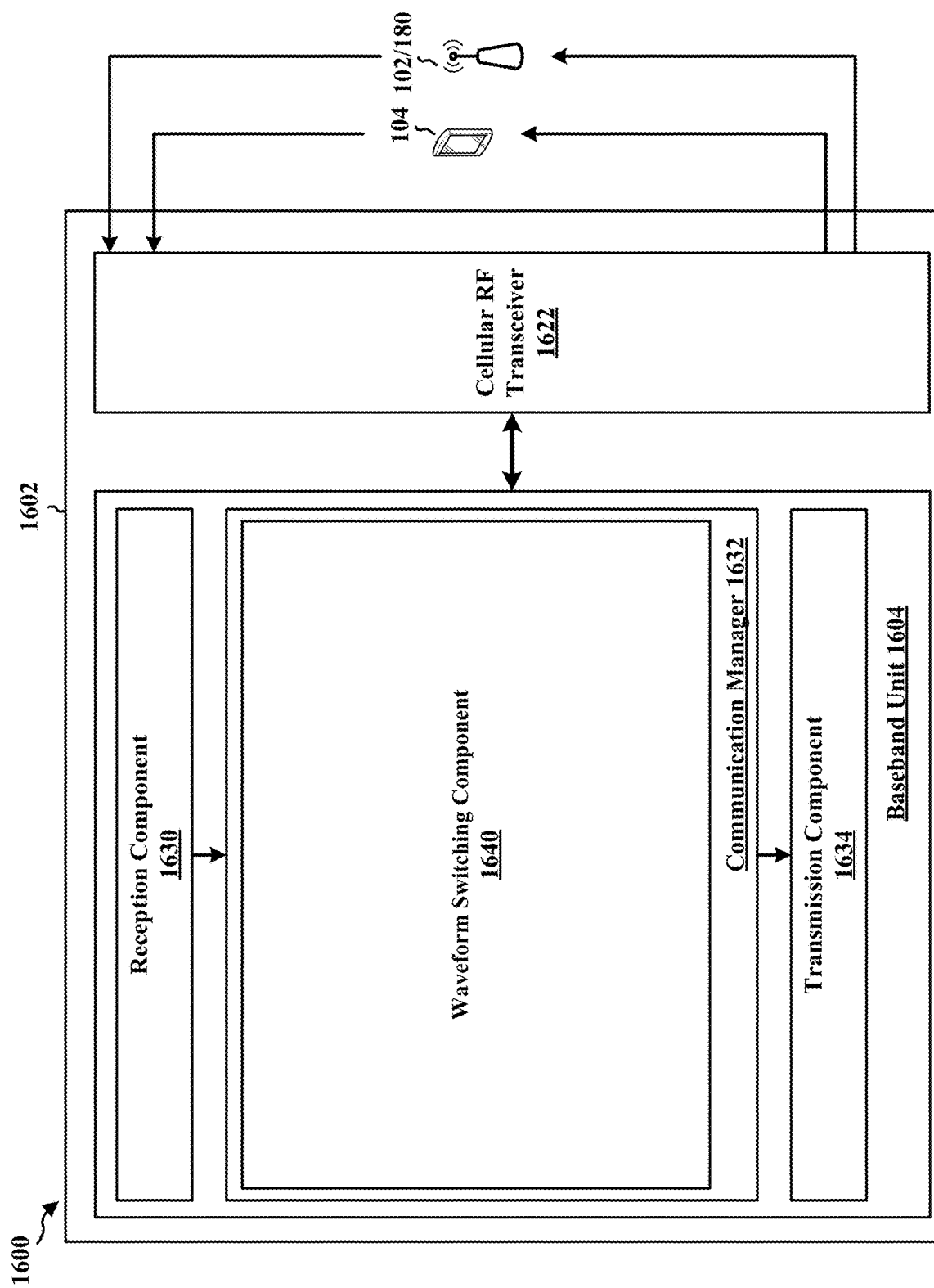
FIG. 16 is a diagram illustrating an example of a hardware implementation for an example apparatus.

FIG. 16 is a diagram 1600 illustrating an example of a hardware implementation for an apparatus 1602. The apparatus 1602 may be a node, a repeater, a repeating device, a component of a (repeater) node, or may implement (repeater) node functionality. In some aspects, the apparatus 1602 may include a baseband unit 1604. The baseband unit 1604 may communicate through a cellular RF transceiver 1622 with the UE 104 and the base station 102/180. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604.

The communication manager 1632 includes a waveform switching component 1640 that may be configured to identify a first indication of a waveform switch associated with a first link between a base station and the node or a second link between the node and a UE, e.g., as described in connection with 1202 in FIG. 12 and 1302 in FIG. 13. The waveform switching component 1640 may be further configured to transmit, to the base station, a second indication of the waveform switch via an FH feedback message, e.g., as described in connection with 1304 in FIG. 13. The waveform switching component 1640 may be further configured to transmit, to the base station, a second indication of the waveform switch, e.g., as described in connection with 1306 in FIG. 13. The waveform switching component 1640 may be further configured to transmit, to the UE, a third indication of the waveform switch, e.g., as described in connection with 1308 in FIG. 13. The waveform switching component 1640 may be further configured to receive, from the base station, an indication of a post-waveform switch resource mapping between a first waveform associated with the first link and a second waveform associated with the second link, e.g., as described in connection with 1310 in FIG. 13. The waveform switching component 1640 may be further configured to execute the waveform switch associated with the first link or the second link, e.g., as described in connection with 1204 in FIG. 12 and 1312 in FIG. 13.

The apparatus may include additional components that perform each of the blocks of the algorithm in the flowcharts of FIGS. 11-13. As such, each block in the flowcharts of FIGS. 11-13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the baseband unit 1604, includes means for identifying a first indication of a waveform switch associated with a first link between a base station and the node or a second link between the node and a UE. The waveform switch may correspond to a first switch from an OFDM waveform to an SC waveform or a second switch from the SC waveform to the OFDM waveform. The apparatus 1602, and in particular the baseband unit 1604, may further include means for executing the waveform switch associated with the first link or the second link In one configuration, the waveform switch may be associated with the first link. In one configuration, the first indication of the waveform switch may be received from the base station. In one configuration, the first indication of the waveform switch may be received from the base station via an RRC message or a MAC-CE. In one configuration, the first indication of the waveform switch may be received from the base station via an FH-PDCCH. In one configuration, the first indication of the waveform switch may be generated at the node. In one configuration, the apparatus 1602, and in particular the baseband unit 1604, may further include means for transmitting, to the base station, a second indication of the waveform switch via an FH feedback message. In one configuration, the waveform switch may be associated with the second link. In one configuration, the first indication of the waveform switch may be generated at the node. In one configuration, the apparatus 1602, and in particular the baseband unit 1604, may further include means for transmitting, to the base station, a second indication of the waveform switch. The apparatus 1602, and in particular the baseband unit 1604, may further include means for transmitting, to the UE, a third indication of the waveform switch. In one configuration, the second indication of the waveform switch may be transmitted to the base station via an FH feedback message. In one configuration, the first indication of the waveform switch may be received from the UE. In one configuration, the apparatus 1602, and in particular the baseband unit 1604, may further include means for transmitting, to the base station, a second indication of the waveform switch. In one configuration, the second indication of the waveform switch may be transmitted to the base station via an FH feedback message. In one configuration, the apparatus 1602, and in particular the baseband unit 1604, may further include means for receiving, from the base station, an indication of a post-waveform switch resource mapping between a first waveform associated with the first link and a second waveform associated with the second link. In one configuration, the indication of the post-waveform switch resource mapping may be received from the base station via an FH-PDCCH.

The means may be one or more of the components of the apparatus 1602 configured to perform the functions recited by the means. As such, in one configuration, the means may be a TX Processor, an RX Processor, and a controller/processor configured to perform the functions recited by the means.

Figure 17:
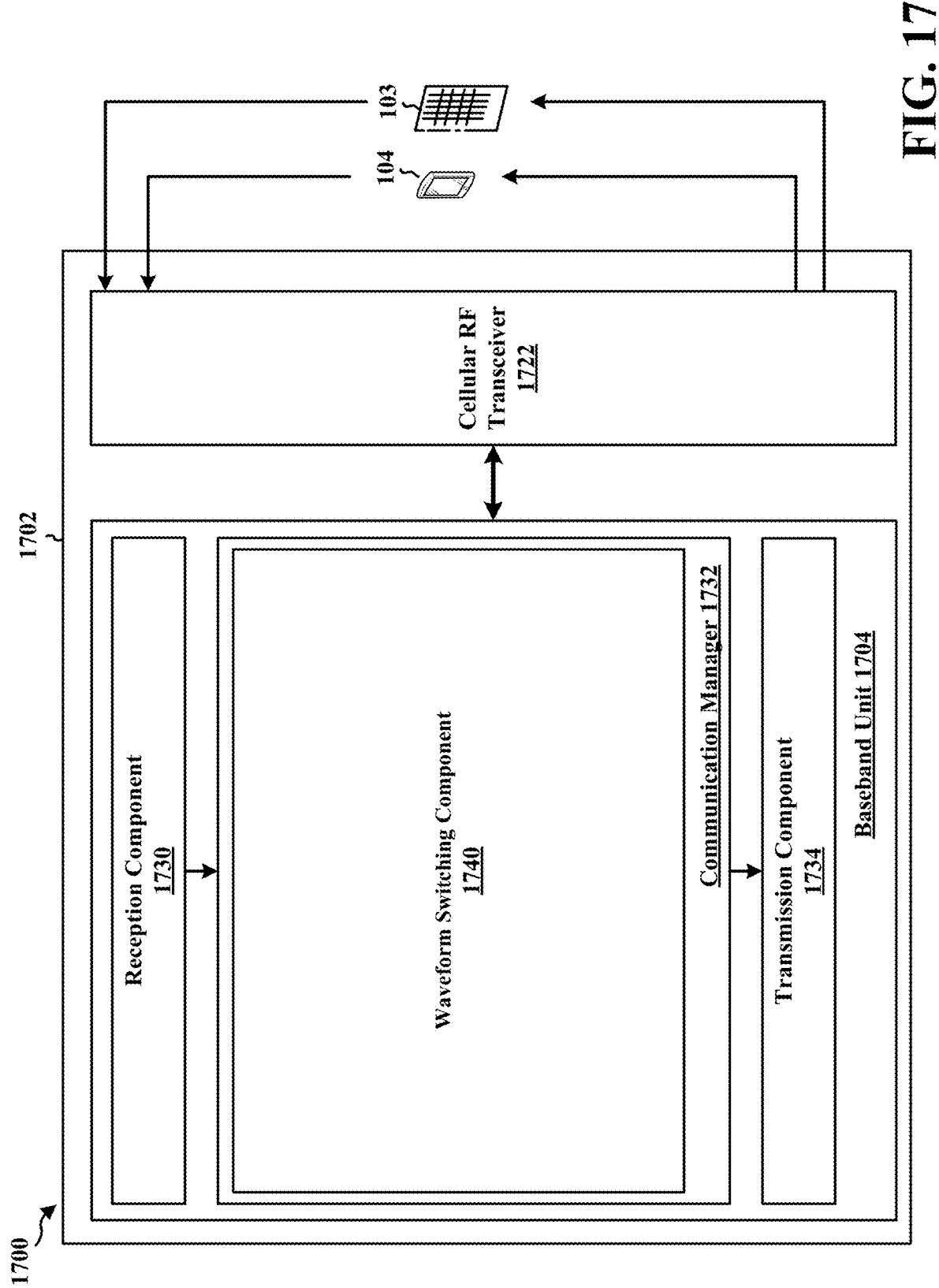
FIG. 17 is a diagram illustrating an example of a hardware implementation for an example apparatus.

FIG. 17 is a diagram 1700 illustrating an example of a hardware implementation for an apparatus 1702. The apparatus 1702 may be a base station, a component of a base station, or may implement base station functionality. In some aspects, the apparatus 1702 may include a baseband unit 1704. The baseband unit 1704 may communicate through a cellular RF transceiver 1722 with the UE 104. The baseband unit 1704 may include a computer-readable medium/memory. The baseband unit 1704 is responsible for general processing, including the execution of software stored on the computer-readable medium/memory. The software, when executed by the baseband unit 1704, causes the baseband unit 1704 to perform the various functions described supra. The computer-readable medium/memory may also be used for storing data that is manipulated by the baseband unit 1704 when executing software. The baseband unit 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the baseband unit 1704. The baseband unit 1704 may be a component of the base station 310 and may include the memory 376 and/or at least one of the TX processor 316, the RX processor 370, and the controller/processor 375.

The communication manager 1732 includes a waveform switching component 1740 that may be configured to identify a first indication of a waveform switch associated with a first link between the base station and a node or a second link between the node and a UE, e.g., as described in connection with 1402 in FIG. 14 and 1502 in FIG. 15. The waveform switching component 1740 may be further configured to transmit, to the node, a second indication of the waveform switch, e.g., as described in connection with 1504 in FIG. 15. The waveform switching component 1740 may be further configured to transmit, to the node, an indication of a post-waveform switch resource mapping between a first waveform associated with the first link and a second waveform associated with the second link, e.g., as described in connection with 1404 in FIG. 14 and 1506 in FIG. 15. The waveform switching component 1740 may be further configured to execute the waveform switch associated with the first link, e.g., as described in connection with 1508 in FIG. 15.

The apparatus may include additional components that perform each of the blocks of the algorithm in the flowcharts of FIGS. 11, 14, and 15. As such, each block in the flowcharts of FIGS. 11, 14, and 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1702 may include a variety of components configured for various functions. In one configuration, the apparatus 1702, and in particular the baseband unit 1704, includes means for identifying a first indication of a waveform switch associated with a first link between the base station and a node or a second link between the node and a UE. The waveform switch corresponding to a first switch from an OFDM waveform to an SC waveform or a second switch from the SC waveform to the OFDM waveform. The apparatus 1702, and in particular the baseband unit 1704, may further include means for transmitting, to the node, an indication of a post-waveform switch resource mapping between a first waveform associated with the first link and a second waveform associated with the second link.

In one configuration, the waveform switch may be associated with the first link. In one configuration, the apparatus 1702, and in particular the baseband unit 1704, may further include means for executing the waveform switch associated with the first link. In one configuration, the first indication of the waveform switch may be generated at the base station. The apparatus 1702, and in particular the baseband unit 1704, may further include means for transmitting, to the node, a second indication of the waveform switch. In one configuration, the second indication of the waveform switch may be transmitted to the node via an RRC message or MAC-CE. In one configuration, the second indication of the waveform switch may be transmitted to the node via an FH-PDCCH. In one configuration, the first indication of the waveform switch may be received from the node via an FH feedback message. In one configuration, the waveform switch may be associated with the second link. In one configuration, the first indication of the waveform switch may be received from the node via an FH feedback message. In one configuration, the indication of the post-waveform switch resource mapping may be transmitted to the node via an FH-PDCCH.

The means may be one or more of the components of the apparatus 1702 configured to perform the functions recited by the means. As described supra, the apparatus 1702 may include the TX Processor 316, the RX Processor 370, and the controller/processor 375. As such, in one configuration, the means may be the TX Processor 316, the RX Processor 370, and the controller/processor 375 configured to perform the functions recited by the means.

Referring back to FIGS. 5A-15, a (repeater) node may identify a first indication of a waveform switch associated with a first link between a base station and the node or a second link between the node and a UE. The waveform switch may correspond to a first switch from an OFDM waveform to an SC waveform or a second switch from the SC waveform to the OFDM waveform. The base station may transmit, to the node, an indication of a post-waveform switch resource mapping between a first waveform associated with the first link and a second waveform associated with the second link. The node may execute the waveform switch associated with the first link or the second link. Accordingly, the waveform in the first link or the second link may be switched in order to improve or maintain the link performance.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a node including at least one processor coupled to a memory and configured to identify a first indication of a waveform switch associated with a first link between a base station and the node or a second link between the node and a UE, the waveform switch corresponding to a first switch from an OFDM waveform to an SC waveform or a second switch from the SC waveform to the OFDM waveform; and execute the waveform switch associated with the first link or the second link.

Aspect 2 is the apparatus of aspect 1, where the waveform switch is associated with the first link.

Aspect 3 is the apparatus of aspect 2, where the first indication of the waveform switch is received from the base station.

Aspect 4 is the apparatus of aspect 3, where the first indication of the waveform switch is received from the base station via an RRC message or a MAC-CE.

Aspect 5 is the apparatus of aspect 3, where the first indication of the waveform switch is received from the base station via an FH-PDCCH.

Aspect 6 is the apparatus of aspect 2, where the first indication of the waveform switch is generated at the node.

Aspect 7 is the apparatus of aspect 6, the at least one processor being further configured to: transmit, to the base station, a second indication of the waveform switch via an FH feedback message.

Aspect 8 is the apparatus of aspect 1, where the waveform switch is associated with the second link.

Aspect 9 is the apparatus of aspect 8, where the first indication of the waveform switch is generated at the node.

Aspect 10 is the apparatus of aspect 9, the at least one processor being further configured to: transmit, to the base station, a second indication of the waveform switch; and transmit, to the UE, a third indication of the waveform switch.

Aspect 11 is the apparatus of aspect 10, where the second indication of the waveform switch is transmitted to the base station via an FH feedback message.

Aspect 12 is the apparatus of aspect 8, where the first indication of the waveform switch is received from the UE.

Aspect 13 is the apparatus of aspect 12, the at least one processor being further configured to: transmit, to the base station, a second indication of the waveform switch.

Aspect 14 is the apparatus of aspect 13, where the second indication of the waveform switch is transmitted to the base station via an FH feedback message.

Aspect 15 is the apparatus of any of aspects 1 to 14, the at least one processor being further configured to: receive, from the base station, an indication of a post-waveform switch resource mapping between a first waveform associated with the first link and a second waveform associated with the second link.

Aspect 16 is the apparatus of aspect 15, where the indication of the post-waveform switch resource mapping is received from the base station via an FH-PDCCH.

Aspect 17 is the apparatus of any of aspects 1 to 16, further including a transceiver coupled to the at least one processor, where the node is a repeater or a repeating device.

Aspect 18 is an apparatus for wireless communication at a base station including at least one processor coupled to a memory and configured to identify a first indication of a waveform switch associated with a first link between the base station and a node or a second link between the node and a UE, the waveform switch corresponding to a first switch from an OFDM waveform to an SC waveform or a second switch from the SC waveform to the OFDM waveform; and transmit, to the node, an indication of a post-waveform switch resource mapping between a first waveform associated with the first link and a second waveform associated with the second link.

Aspect 19 is the apparatus of aspect 18, where the waveform switch is associated with the first link.

Aspect 20 is the apparatus of aspect 19, the at least one processor being further configured to: execute the waveform switch associated with the first link.

Aspect 21 is the apparatus of any of aspects 19 and 20, where the first indication of the waveform switch is generated at the base station, and the at least one processor is further configured to: transmit, to the node, a second indication of the waveform switch.

Aspect 22 is the apparatus of aspect 21, where the second indication of the waveform switch is transmitted to the node via an RRC message or MAC-CE.

Aspect 23 is the apparatus of aspect 21, where the second indication of the waveform switch is transmitted to the node via an FH-PDCCH.

Aspect 24 is the apparatus of any of aspects 19 and 20, where the first indication of the waveform switch is received from the node via an FH feedback message.

Aspect 25 is the apparatus of aspect 18, where the waveform switch is associated with the second link.

Aspect 26 is the apparatus of aspect 25, where the first indication of the waveform switch is received from the node via an FH feedback message.

Aspect 27 is the apparatus of any of aspects 18 to 26, where the indication of the post-waveform switch resource mapping is transmitted to the node via an FH-PDCCH.

Aspect 28 is the apparatus of any of aspects 18 to 27, further including a transceiver coupled to the at least one processor, where the node is a repeater or a repeating device.

Aspect 29 is a method of wireless communication for implementing any of aspects 1 to 28.

Aspect 30 is an apparatus for wireless communication including means for implementing any of aspects 1 to 28.

Aspect 31 is a computer-readable medium storing computer executable code, where the code when executed by a processor causes the processor to implement any of aspects 1 to 28.

What is claimed is:

1. An apparatus for wireless communication at a node, comprising:
    a memory; and
    at least one processor coupled to the memory and configured to:
    identify a first indication of a second waveform switch associated with a second link between the node and a user equipment (UE), the second waveform switch corresponding to a first switch from an orthogonal frequency division multiplexing (OFDM) waveform to a single carrier (SC) waveform or a second switch from the SC waveform to the OFDM waveform;
    identify a third indication of a first waveform switch associated with a first link between a base station and the node, the first waveform switch corresponding to the first switch from the OFDM waveform to the SC waveform or the second switch from the SC waveform to the OFDM waveform;
    execute the first waveform switch associated with the first link; and
    execute the second waveform switch associated with the second link.

2. The apparatus of claim 1, wherein the third indication of the first waveform switch is received from the base station.

3. The apparatus of claim 2, wherein the third indication of the first waveform switch is received from the base station via a radio resource control (RRC) message or a medium access control (MAC)—control element (CE) (MAC-CE).

4. The apparatus of claim 2, wherein the third indication of the first waveform switch is received from the base station via a fronthaul (FH)—physical downlink control channel (PDCCH) (FH-PDCCH).

5. The apparatus of claim 1, wherein the third indication of the first waveform switch is generated at the node.

6. The apparatus of claim 5, the at least one processor being further configured to:
    transmit, to the base station, a second indication of the first waveform switch via a fronthaul (FH) feedback message.

7. The apparatus of claim 1, wherein the first indication of the second waveform switch is generated at the node.

8. The apparatus of claim 7, the at least one processor being further configured to:
    transmit, to a base station, a second indication of the second waveform switch; and transmit, to the UE, a third indication of the second waveform switch.

9. The apparatus of claim 8, wherein the second indication of the second waveform switch is transmitted to the base station via a fronthaul (FH) feedback message.

10. The apparatus of claim 1, wherein the first indication of the second waveform switch is received from the UE.

11. The apparatus of claim 10, the at least one processor being further configured to:
transmit, to a base station, a second indication of the second waveform switch.

12. The apparatus of claim 11, wherein the second indication of the second waveform switch is transmitted to the base station via a fronthaul (FH) feedback message.

13. The apparatus of claim 1, the at least one processor being further configured to:
receive, from a base station, an indication of a post-waveform switch resource mapping between a first waveform associated with the first link and a second waveform associated with the second link, the first link being between the base station and the node.

14. The apparatus of claim 13, wherein the indication of the post-waveform switch resource mapping is received from the base station via a fronthaul (FH)—physical downlink control channel (PDCCH) (FH-PDCCH).

15. The apparatus of claim 1, further comprising a transceiver coupled to the at least one processor, wherein the node is a repeater or a repeating device.

16. A method of wireless communication at a node, comprising:
identifying a first indication of a second waveform switch associated with a second link between the node and a user equipment (UE), the second waveform switch corresponding to a first switch from an orthogonal frequency division multiplexing (OFDM) waveform to a single carrier (SC) waveform or a second switch from the SC waveform to the OFDM waveform;
identifying a third indication of a first waveform switch associated with a first link between a base station and the node, the first waveform switch corresponding to the first switch from the OFDM waveform to the SC waveform or the second switch from the SC waveform to the OFDM waveform;
executing the first waveform switch associated with the first link; and
executing the second waveform switch associated with the second link.

17. An apparatus for wireless communication at a base station, comprising:
a memory; and
at least one processor coupled to the memory and configured to:
identify a first indication of a second waveform switch associated with a second link between a node and a user equipment (UE), the second waveform switch corresponding to a first switch from an orthogonal frequency division multiplexing (OFDM) waveform to a single carrier (SC) waveform or a second switch from the SC waveform to the OFDM waveform; and transmit, to the node, an indication of a post-waveform switch resource mapping between a first waveform associated with a first link and a second waveform associated with the second link, the first link being between the base station and the node.

18. The apparatus of claim 17, the at least one processor being further configured to:
identify a third indication of a first waveform switch associated with the first link between the base station and the node, the first waveform switch corresponding to the first switch from the OFDM waveform to the SC waveform or the second switch from the SC waveform to the OFDM waveform.

19. The apparatus of claim 18, the at least one processor being further configured to:
execute the first waveform switch associated with the first link.

20. The apparatus of claim 18, wherein the third indication of the first waveform switch is generated at the base station, and the at least one processor is further configured to:
transmit, to the node, a second indication of the first waveform switch.

21. The apparatus of claim 20, wherein the second indication of the first waveform switch is transmitted to the node via a radio resource control (RRC) message or a medium access control (MAC)—control element (CE) (MAC-CE).

22. The apparatus of claim 20, wherein the second indication of the first waveform switch is transmitted to the node via a fronthaul (FH)—physical downlink control channel (PDCCH) (FH-PDCCH).

23. The apparatus of claim 18, wherein the first third indication of the first waveform switch is received from the node via a fronthaul (FH) feedback message.

24. The apparatus of claim 17, wherein the first indication of the second waveform switch is received from the node via a fronthaul (FH) feedback message.

25. The apparatus of claim 17, wherein the indication of the post-waveform switch resource mapping is transmitted to the node via a fronthaul (FH)—physical downlink control channel (PDCCH) (FH-PDCCH).

26. The apparatus of claim 17, further comprising a transceiver coupled to the at least one processor, wherein the node is a repeater or a repeating device.

27. A method of wireless communication at a base station, comprising:
identifying a first indication of a second waveform switch associated with a second link between a node and a user equipment (UE), the second waveform switch corresponding to a first switch from an orthogonal frequency division multiplexing (OFDM) waveform to a single carrier (SC) waveform or a second switch from the SC waveform to the OFDM waveform; and
transmitting, to the node, an indication of a post-waveform switch resource mapping between a first waveform associated with a first link and a second waveform associated with the second link, the first link being between the base station and the node.

* * * * *